United States Patent
Michael

(10) Patent No.: US 9,491,604 B2
(45) Date of Patent: Nov. 8, 2016

(54) METHOD AND SYSTEM FOR PLACING AN EMERGENCY PHONE CALL FROM A MOBILE COMMUNICATION DEVICE TO AN ENTERPRISE

(75) Inventor: Mark Michael, Kitchener (CA)

(73) Assignee: BlackBerry Limited, Waterloo (CA)

( * ) Notice: Subject to any disclaimer, the term of this patent is extended or adjusted under 35 U.S.C. 154(b) by 539 days.

(21) Appl. No.: 12/910,183

(22) Filed: Oct. 22, 2010

(65) Prior Publication Data

US 2012/0100824 A1  Apr. 26, 2012

(51) Int. Cl.
*H04M 1/725* (2006.01)
*H04W 4/22* (2009.01)
*H04W 4/02* (2009.01)

(52) U.S. Cl.
CPC .............. *H04W 4/22* (2013.01); *H04W 4/023* (2013.01)

(58) Field of Classification Search
None
See application file for complete search history.

(56) References Cited

U.S. PATENT DOCUMENTS

| | | | |
|---|---|---|---|
| 6,766,159 B2 * | 7/2004 | Lindholm | 455/404.1 |
| 6,882,706 B2 * | 4/2005 | Andrew | 379/45 |
| 7,110,772 B1 | 9/2006 | Wu | |
| 7,113,764 B1 | 9/2006 | Jang et al. | |
| 7,991,382 B1 * | 8/2011 | Gunasekara | 455/404.2 |
| 2002/0136360 A1 * | 9/2002 | Stumer | H04M 3/42 379/37 |
| 2002/0170954 A1 * | 11/2002 | Zingher et al. | 235/375 |
| 2004/0095276 A1 * | 5/2004 | Krumm et al. | 342/465 |
| 2004/0105529 A1 * | 6/2004 | Salvucci et al. | 379/45 |
| 2004/0140928 A1 * | 7/2004 | Cleghorn | 342/357.07 |
| 2004/0203567 A1 | 10/2004 | Berger | |
| 2004/0242191 A1 * | 12/2004 | Hossain et al. | 455/404.1 |
| 2005/0197097 A1 * | 9/2005 | Mohler | 455/404.2 |
| 2006/0072549 A1 | 4/2006 | Goldman et al. | |
| 2006/0172720 A1 * | 8/2006 | Islam et al. | 455/404.1 |
| 2006/0193447 A1 | 8/2006 | Schwartz | |
| 2008/0200142 A1 * | 8/2008 | Abdel-Kader et al. | 455/404.2 |
| 2009/0091450 A1 * | 4/2009 | Deavila | 340/572.1 |
| 2010/0103048 A1 * | 4/2010 | Bamberger et al. | 342/451 |
| 2011/0068981 A1 * | 3/2011 | Marks et al. | 342/451 |

FOREIGN PATENT DOCUMENTS

| | | |
|---|---|---|
| EP | 1061716 A2 | 12/2000 |
| JP | 2002057621 | 2/2002 |
| JP | 2005020109 | 1/2005 |
| WO | 20080112666 A1 | 9/2008 |

OTHER PUBLICATIONS

"Extended European Search Report", European Patent Application No. 10188573.9, Oct. 5, 2001, 6 pages.
Patent Abstracts of Japan JP 2002-057621, published Feb. 22, 2002, 2 pages.
Patent Abstracts of Japan JP 2005-020109, published Jan. 20, 2005, 2 pages.

* cited by examiner

*Primary Examiner* — Kent Chang
*Assistant Examiner* — Benjamin Morales Fernandez
(74) *Attorney, Agent, or Firm* — Borden Ladner Gervais LLP; Todd Keeler

(57) ABSTRACT

A method and system are provided for speed-dialing an emergency phone call, from a mobile communication device to an enterprise, based on enterprise location data and a selected enterprise emergency-response service. Enterprise location data can be based on prior interaction between a token, uniquely associated with the mobile communication device, and an enterprise electronic location system. Upon termination, possibly automatic, of a first emergency phone call, a second emergency phone call, to an alternate emergency-response service, can be enabled or automatically dialed.

25 Claims, 10 Drawing Sheets

| Look-up Table for Corporate Security Call 710 ||
| --- | --- |
| Service Area | Corporate Security Phone Number |
| Waterloo | 519-555-7465 x123 |
| Ottawa | 613-555-4567 x234 |
| Mississauga | 905-555-5678 x345 |

*FIG. 7A*

| Look-up Table for Department First-Aid Call 720 ||
| --- | --- |
| Service Area | First-Aid Phone Number |
| Waterloo, Bldg 30, Floor 5, Legal Dept | 519-555-7465 x121 |
| Waterloo, Bldg 30, Floor 5, Accts Payable | 519-555-7465 x122 |
| Waterloo, Bldg 31, Floor 1 | 519-555-7465 x235 |

*FIG. 7B*

| Look-up Table for All Services, Based on Latest Location Data 800 ||
| --- | --- |
| Service | Emergency Phone Number |
| Civil Emergency Response | 911 |
| Corporate Security Response | 519-555-7465 x123 |
| Department First-Aid Response | 519-555-7465 x121 |

*FIG. 8*

METHOD AND SYSTEM FOR PLACING AN EMERGENCY PHONE CALL FROM A MOBILE COMMUNICATION DEVICE TO AN ENTERPRISE

FIELD OF TECHNOLOGY

The present application relates to mobile communication devices and in particular to speed-dialing an emergency phone number from mobile communication devices.

BACKGROUND INFORMATION

Speed-dialing, i.e., dialing a predetermined phone number by pressing just a speed-dial key or short key-sequence, is well known in the art. In particular, it is well known to set up speed-dial keys or key-sequences for dialing specific emergency phone numbers to request a response to different, respective local emergency-response services, e.g., police, fire, and ambulance services. Speed-dialing is typically configured on each individual phone by its user.

A different, but more centralized approach to speed-dialing emergency phone numbers is to have a common, short sequence of digits that can be dialed from any phone in a large service area for that phone number, even though different local emergency responders will be contacted, depending on the location of the caller. (Such an emergency phone number may also be universal in the sense that it can be used to request a response to any of a wide variety of emergencies.) Such universal emergency phone numbers vary from geographic region to region. For example, 9-1-1 is used in most of the United States and Canada, while 1-1-2 is used throughout the European Union.

It is known in the art to pre-program a mobile communication device, such as a smart phone, to provide the user an option, perhaps even from a "locked" state (wherein the device has substantially all functionality disabled), to speed-dial such an emergency phone number. Moreover, it is known to pre-program (or update) the device to correctly dial whatever emergency phone number is appropriate for the region from which the caller is dialing. Co-pending U.S. patent application Ser. No. 11/048,766 filed Feb. 3, 2005, and published Aug. 3, 2006, as U.S. 2006/0172720 A1 teaches inter alia the use of a coarse-grained geographic indicator to select the appropriate emergency phone number in a Public Switched Telephone Network (PSTN). Co-pending U.S. patent application Ser. No. 11/625,121 filed Feb. 15, 2007, and published Aug. 21, 2008, as U.S. 2008/0200142 A1 teaches similarly for a Voice over Internet Protocol (VoIP) emergency phone call.

The known art teaches only solutions directed to contacting civil emergency-response services. Emergency phone calls are commonly routed to a centralized call-centre or dispatch-centre. For example, in the United States, a Public Safety Answering Point (PSAP) may serve an entire county. PSAP operators then forward requests for emergency-response services to different responders depending on the nature and location of the emergency. The caller's fine-grained location, typically indicated as an address, can usually be determined—in case the caller cannot communicate it—even if the emergency phone call is placed from a mobile communication device. Thus, the fine-grained location of the caller can be determined after the emergency phone call is made.

An enterprise environment presents opportunities for emergency response that is more fine-grained and, therefore, more immediate. The enterprise may have its own (or contracted) security personnel who are on site and can respond much more quickly to certain type of emergencies than civil responders can. Moreover, certain types of emergencies are only of concern to the enterprise or are preferably kept private. For example, a case of insider corporate espionage might be something that the enterprise desires to keep as an internal manner, to avoid publicity. For these two reasons, it would be desirable to call corporate security, rather than civil responders.

Furthermore, the enterprise may be organized to have "regular" employees (as opposed to dedicated security personnel) trained for and tasked with responding to first-aid emergencies. Such first-aid providers would likely be more numerous and distributed as a finer-mesh safety net (probably at least one qualified first-aid provider per building or floor within a building) than dedicated security personnel, who may not be in every building or may be roaming. So in some circumstances, it would be better to call a particular co-worker than the main corporate security phone number. Typically, each such employee would have a different phone number or extension; the intended area for that employee to provide first-aid service would be the "service area" for his or her phone number or extension, viewed as an emergency phone number.

However, such a fine-grained approach to emergency-response service presents a new problem: how to determine the location of a calling device precisely enough—before the emergency phone call is placed—so that the correct emergency phone number is dialed. The previously mentioned prior-art techniques for determining the location of a device before it makes an emergency phone call have only determined the country or region in which the emergency phone call is being made. The location-determining methods of those solutions rely on information provided from the cellular or VoIP system being used to make the emergency phone call.

Other resources, unrelated to the calling system, can potentially be used to determine a device's location before it places a phone call. A mobile communication device may be able to determine some information about its location from the wireless access point through which it is accessing a voice/data network other the network used for phone communication. An example would be a Wi-Fi access point. But a single wireless access point may serve several buildings, making it impossible to target a phone call to one specific first-aid provider. Even triangulation of signals from wireless access points is designed to provide first-responders with a caller's address, not a particular room on a particular floor of a building.

An obvious choice for determining position is Global Positioning System (GPS) technology, which has become so prevalent that it is now common in mobile communication devices. Yet accessing GPS signals within a building can be very slow (or perhaps impossible far from windows or in a basement) and may not be accurate enough to ascertain which floor a caller is on. Moreover, even if GPS co-ordinates could reliably be determined with adequate speed and accuracy, considerable preparatory work would ne needed to map three-dimensional regions of space to target phone numbers.

Accordingly, there is a need to facilitate placing an emergency phone call from a mobile communication device to an enterprise.

BRIEF DESCRIPTION OF THE DRAWINGS

Various embodiments will now be described, by way of example only, with reference to the attached Figures, wherein:

FIGS. 7A and 7B are partial representations of data stored in alternative service-specific phone-number look-up tables;

FIG. 8 is a partial representation of data stored in an exemplary location-specific phone-number look-up table;

and wherein reference numerals are used throughout the Figures to denote similar elements and features.

DETAILED DESCRIPTION

In one aspect according to the present disclosure, a method is provided for placing an emergency phone call from a mobile communication device enabled for voice communication and for data communication. The method comprises: receiving, at the mobile communication device, a selection of an enterprise emergency-response service; determining an emergency phone number based on the selected emergency-response service and on enterprise location data associated with the mobile communication device; and placing the emergency phone call from the mobile communication device to the determined emergency phone number.

In another aspect according to the present disclosure, a system is provided for placing an emergency phone call. The system comprises a mobile communication device enabled for voice communication and for data communication and an electronic location system enabled for creating enterprise location data associated with said mobile communication device. The mobile communication device is further enabled for receiving a selection of an enterprise emergency-response service; and for placing an emergency phone call to an emergency phone number determined based on said selected emergency-response service and on enterprise location data associated with said mobile communication device.

Figure 1:
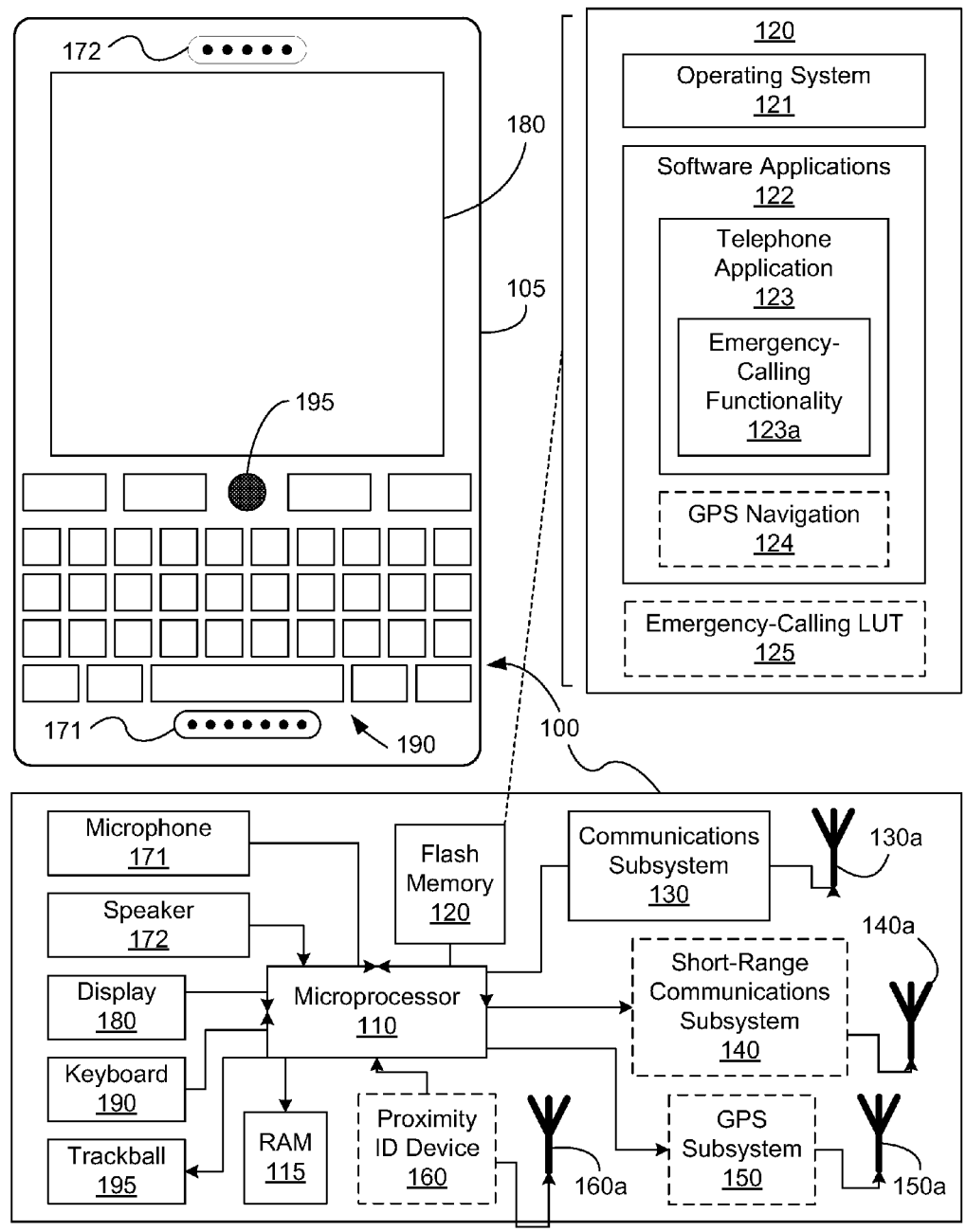
FIG. 1 is a schematic and block diagram of a conventional mobile communication device.

Referring first to FIG. 1, there are shown a schematic diagram and a block diagram of a conventional mobile communication device 100, for example a smart phone. Optional components are shown in dashed outline. The components of device 100 are contained within housing 105. Microprocessor 110 is connected to communication subsystem 130, which has a radio-frequency (RF) transceiver chip (not shown) and antenna 130a, through which device 100 can send and receive both phone and data communications. Data communications can be, for example, conventional email, data, and/or program code requested by device 100 or pushed to it by a corporate entity associated with the device. Data communications can include information useful to the novel method and system of the present disclosure. A person skilled in the art will understand that multiple antennas can be used if device 100 is designed to communicate over several different RF bands.

Device 100 can contain additional, optional communication components connected to microprocessor 110. A short-range communication subsystem 140 (typically including its own antenna 140a and chip) can, for example, enable Blue Tooth communication between device 100 and a nearby, compatibly equipped external device. Such optional communication components can aid in determining the current position of device 100 for some embodiments of the novel method and system of the present disclosure. For example, satellite-based location-determining hardware can be GPS subsystem 150 (typically including its own antenna 150a and chip); microprocessor 110 can run corresponding processing software, e.g., GPS Navigation application 124. As will be understood by a skilled person, GPS is but one exemplary location-determining system. Thus, the term "GPS" as used herein is meant to include any analogous system. Device 100 can also optionally include a token for contactless registration with an electronic asset-tracking or access-control system. It is represented as proximity identification device 160. Such a contactless identification device can be, for example, a radio-frequency identification (RFID) device, which conventionally contains its own antenna (160a) and chip.

A user can interact with device 100—both for data communication and for controlling the functionality of the device—through a variety of input/output (IO) devices connected to microprocessor 110. These include microphone 171 and speaker 172, both of which can be used for, among other things, phone calls by a user of device 100. The user can receive crude visual information via a signal light (not shown) to indicate data transfer, battery-charging status, etc. The primary visual output device is display 180. The principal input device is keyboard 190. Alternatively, the functionality of display 180 and keyboard 190 can be integrated in a touchscreen (not shown). An auxiliary input device is depressible, scrollable trackball 195 or thumbwheel (not shown) or an optical navigation pad (not shown), which can also be depressible.

Microprocessor 110 is further connected to random-access memory (RAM) 115 for executing computer instructions, optional removable memory (not shown) for storing media of various formats, and flash memory 120 for storing, amongst other things, operating system 121 for running software applications 122 and for managing the electronic resources of device 100. As is well known, software applications 122 can be of a wide variety. In particular, telephone application 123 can provide emergency-calling functionality 123a, of a novel form described herein. In regard to that novel functionality, flash memory 120 can additionally include emergency-calling look-up table 125.

Figure 2:
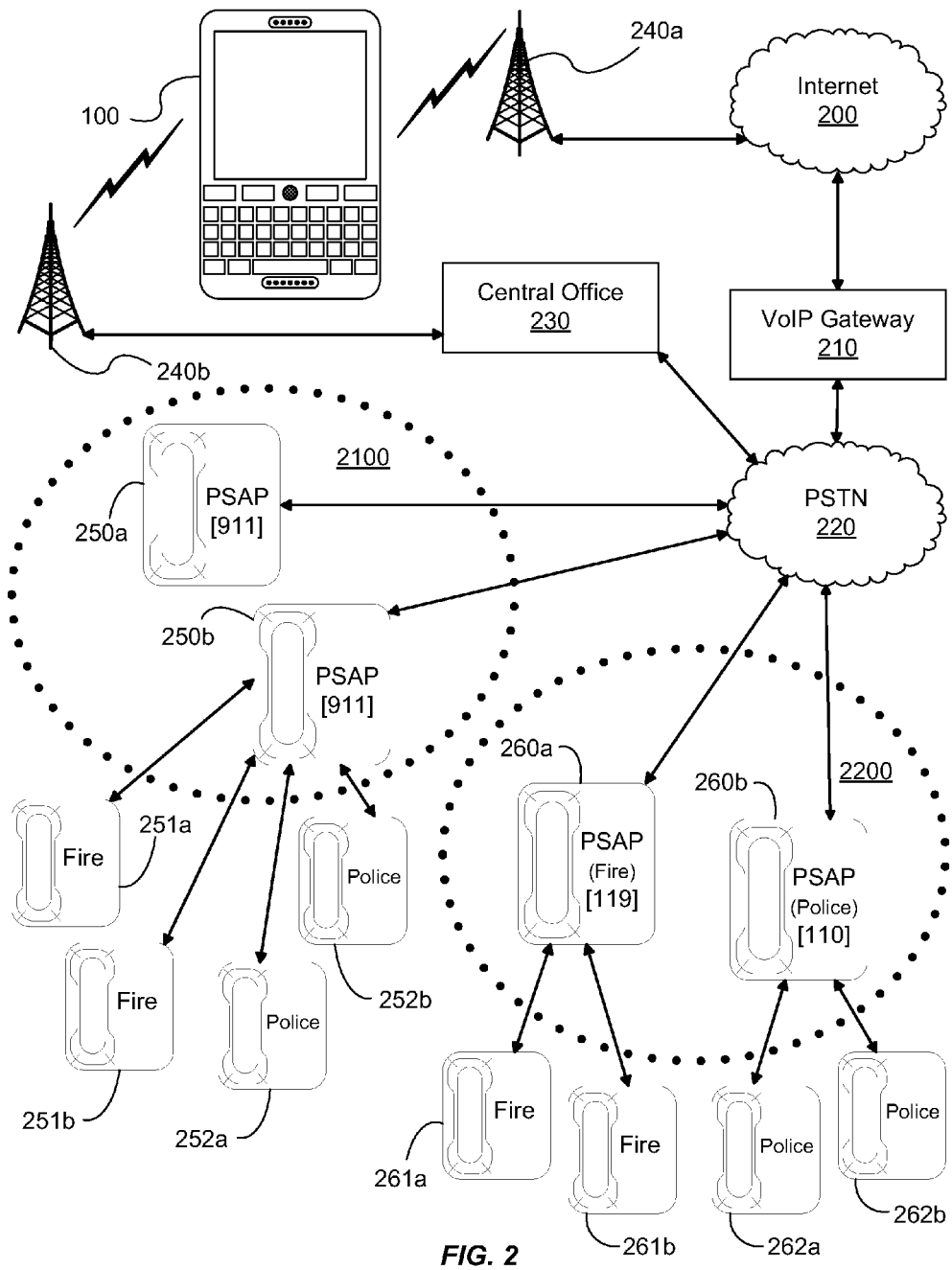
FIG. 2 is a block diagram of conventional communication networks through which the device of FIG. 1 can communicate to civil emergency authorities.

Now in reference to FIG. 2, a block diagram is shown depicting a conventional system and method by which device 100 can place an emergency phone call for civil emergency-response service. Device 100 is in data and voice communication with base stations such as 240a and 240b. It will be understood that, at any given moment, device 100 may be completely out of radio contact with any communication service for which it has access privileges; in such circumstance, the method and system of this disclosure are temporarily inoperable. At other times, device 100 may be able to communicate with more than one base station, for one or for different communication systems. Data communication is shown as going from device 100 through base station 240a to the Internet 200. Traditional wireless voice communication is shown going from device 100 through base station 240b and central office 230 to the traditional, public switched telephone network (PSTN) 220. Alternatively, voice communication can be sent as a VoIP phone call through the Internet 200 and thence to the PSTN via VoIP gateway 210.

As mentioned earlier, it is known to configure mobile communication device 100 so that, without dialing a sequence of digits—which sequence may, in fact, be unknown to the user—a user can speed-dial an emergency phone call regardless of where the user is located. Continuing in reference to FIG. 2, two different geographic regions (depicted by dotted outlines) for civil emergency-response service are shown. Geographic region 2100 is one, such as Canada or the United States, in which the sequence 9-1-1 is recognized as corresponding to an emergency phone call of any nature. Geographic region 2200 is one, such as China or Japan, in which the sequence 1-1-9 is recognized as corresponding to a fire emergency phone call, while the sequence 1-1-0 is recognized as corresponding to a police emergency phone call. There are yet other regions (not shown), such as in many European countries, in which a first sequence is recognized as corresponding to a fire emergency phone call, a second sequence is recognized as corresponding to a police emergency phone call, yet a third sequence is recognized for all types of emergencies.

It is important to emphasize that even when a country such as China or Japan has distinct phone numbers for different emergency-response services, those phone numbers are universal in the sense that they provide the same emergency-response service regardless of where in the country an emergency phone call is placed. In other words, the "service area" for each emergency phone number is an entire country. As used herein, the term "service area for an emergency phone number" means the area for which a desired emergency response can be summoned by dialing the phone number. Such an area can be vastly larger than the area served by a particular fire hall, police station, ambulance company, etc.

In a previously disclosed method and system, device 100 determines which emergency phone number should be speed-dialed based on (a) a country code or mobile country code obtained from the wireless access point (such as base stations 240a and 240b) through which it is placing the emergency phone call and (b) emergency-calling look-up table 125 stored on the device. For example, if the user is presented with a generic option to place an emergency phone call (for example option 902 in FIG. 9), selection of the option (possibly with a second confirmatory action) by a user of device 100 would result in 9-1-1 being speed-dialed if the user were in Toronto, Canada, but 1-1-2 if he or she were in Paris, France. How device 100 reacts to such user input in Beijing, China, depends on whether the emergency-calling look-up table has been populated with the universal police phone number or with the universal fire phone number. Alternatively, device 100 can be programmed to provide separate options to speed-dial police and fire phone numbers, with each option resulting in 9-1-1 being dialed when the user is in a region (e.g., Canada) having a unified universal emergency phone number. In yet another alternative embodiment, device 100 can be programmed to provide a generic option when the user is in a region having a unified universal emergency phone number, but separate options to call police and fire phone numbers when he or she is in a region (e.g., China) having separate universal phone numbers for the separate services.

Continuing in reference to FIG. 2, once the appropriate emergency phone number has been dialed, the local PSTN will determine to which of many public service access points (PSAPs) the phone call should be routed. If 9-1-1 is dialed from region 2100, the phone call is routed to call-centre 250a or 250b, depending on the originating location of the phone call within the region. As is known in the art, routing emergency phone calls from a wireless phone such as device 100 to the appropriate phone centre that will handle the phone call is not as straightforward as routing emergency phone calls from "land lines" (phones, even the cordless variety, that are associated with a fixed physical address). Nevertheless, this is a technological challenge that has been met and is not germane herein.

The particular PSAP may still deal with phone calls from within a fairly substantial area. For example, in the United States, a PSAP may handle emergency phone calls for an entire county. If, for example, an emergency phone call has been routed to call-centre 250b, the call-centre must further convey an appropriate message to one of several—possibly many—specific civil emergency responders, such as fire halls 251a and 251b and police stations 252a and 252b. In region 2200, two separate emergency phone numbers are recognized for fire and police response; only one PSAP is depicted for each service, but many separate ones for each service likely exist. Call-centre 260a, upon receiving a phone call placed to 1-1-9, conveys a message to one of fire halls 261a and 261b. Likewise, call-centre 260b, upon receiving a phone call placed to 1-1-0, conveys a message to one of police stations 262a and 262b.

In summary, a conventional, civil emergency-response phone call from device 100 is routed through the PSTN to a particular PSAP, which answers the phone call. After either discussing the emergency with the user, if possible, or tracing the phone call (through a phone-number-to-address look-up in the case of a landline phone call or a triangulation or other technique in the case of a wireless phone call) if the user is unable to speak, the call-centre alerts an appropriate responder as to the emergency.

Figure 3:
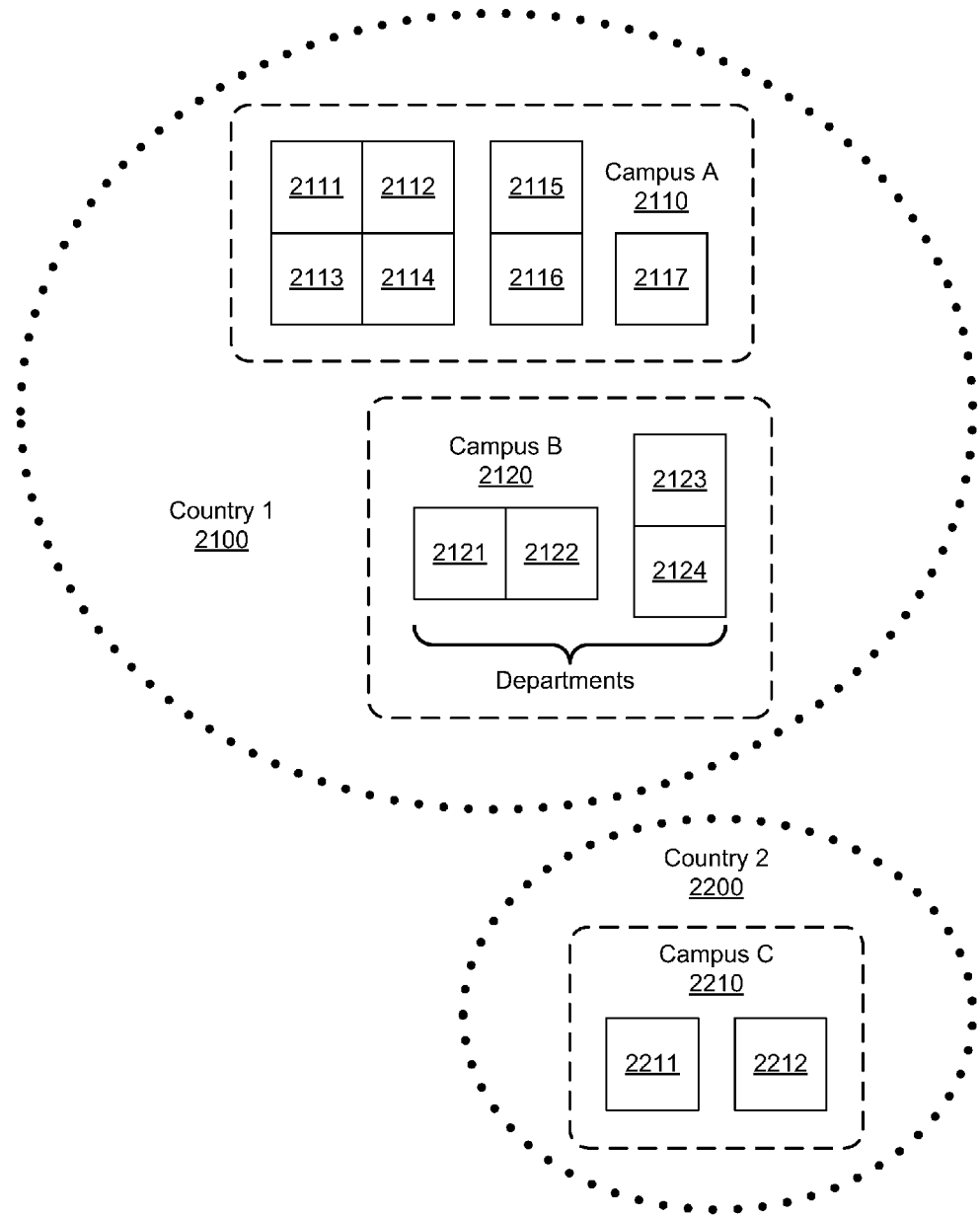
FIG. 3 is a block diagram depicting service areas for different phone numbers for enterprise emergency-response services, in the context of service areas for non-enterprise emergency-response services.
Figure 4:
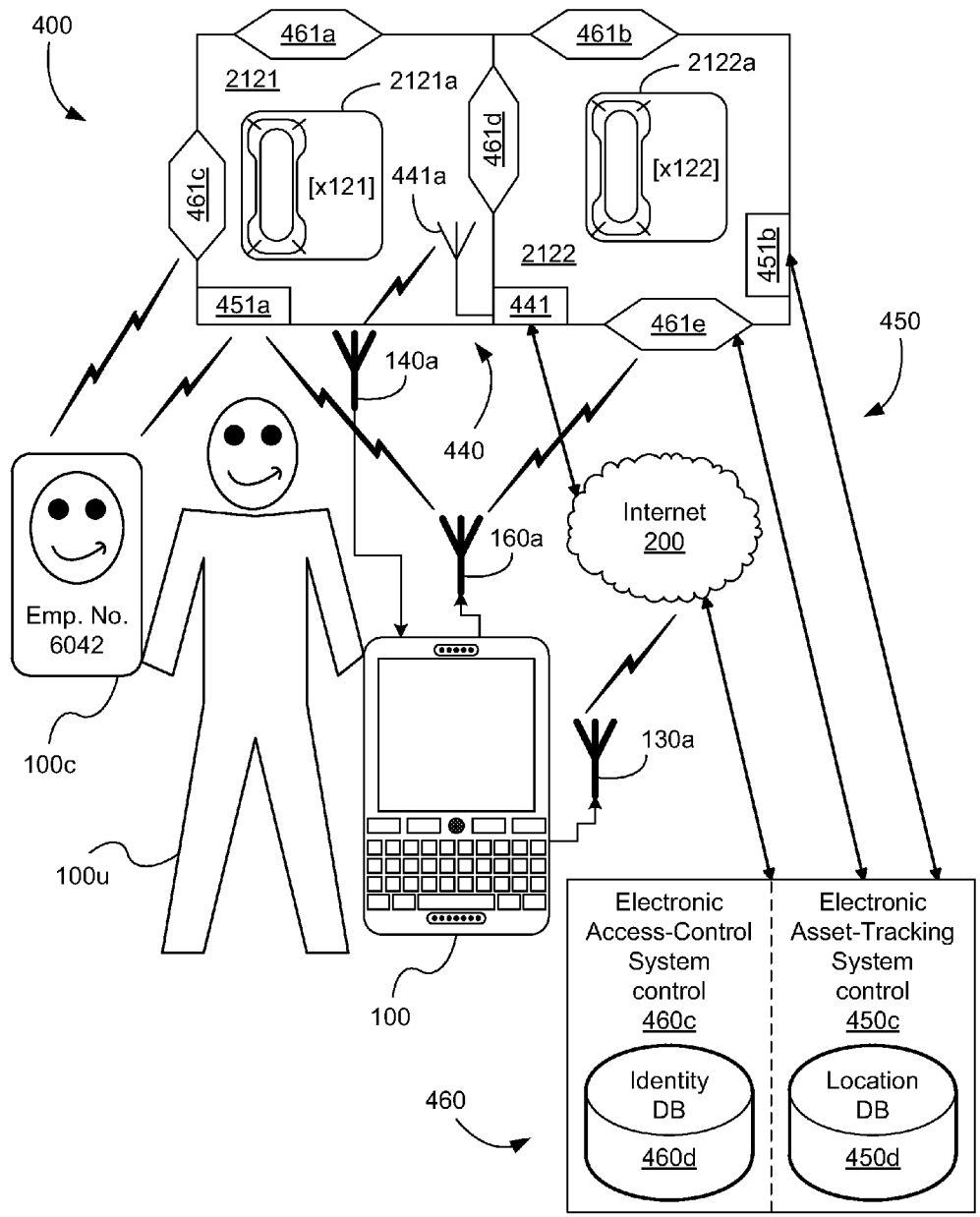
FIG. 4 is a block diagram of an enterprise electronic location system with which a token associated with the device of FIG. 1 can interact.

Turning to FIG. 3, a block diagram shows a very different situation: an enterprise emergency-response service hosted by a corporation or organization other than civil authorities, a service whose "service areas" (shown in solid outline), corresponding to distinct contact phone numbers, are orders of magnitude smaller than the large geographic regions 2100 and 2200 of a civil emergency-response service. Areas 2211 and 2212 can be individual buildings belonging to, occupied by, or controlled by the enterprise. Areas 2123 and 2124 can be different floors within a building. Areas 2121 and 2122 can be portions with a single floor of a building, possibly distinct rooms separated by common door 461d therebetween, as shown in FIG. 4.

These very small, "departmental" service areas are appropriate when a large number of employees, each with a separate phone number (or extension), are each specially trained and able to provide immediate first aid within their respective service areas.

Notably, the granularity of the separate service areas for "departmental" emergency response is fine enough that location information for device 100 gleaned from wireless access points or GPS data (even if it could be accessed promptly—or at all—from within a building) is not accurate enough to determine in which of these small regions the device and its user are located.

There can, in fact, be more than one "level" of enterprise emergency-response service. Such levels can correspond to different levels of urgency in the corresponding emergencies. Moreover, the levels can be ranked. For example, at some enterprise, a release of toxic gas, a fire, and a need for first aid—each requiring a different type of emergency responder—might be ranked highest, middle, and lowest in urgency, respectively. In FIG. 3, the levels can be taken to correspond to granularities. Moreover, service areas of a finer-granularity level can be nested within service areas of another, coarser-granularity level. In particular, several distinct department-level services areas (depicted by solid outlines) can lie within the same campus-level service areas (depicted by dashed outlines), as will be explained later in more detail.

Continuing in reference to FIG. 3, the emergency-response service of coarsest granularity, the classic "civil" emergency-response service already described at length in reference to FIG. 2, has service areas which are large geographical regions, such as regions 2100 and 2200 (depicted by dotted outlines), each corresponding to a common emergency phone number for contacting civil responders. In practice, country codes or mobile country codes may distinguish between two countries (e.g., Canada and the United States) that share a single civil emergency phone number (viz., 9-1-1). Whether, for this emergency-response service, Canada and the United States are implemented as separate service areas or a single service area is irrelevant for the final effect of matching a current location of device 100 to the correct civil emergency phone number.

Within the civil emergency-response service areas are service areas of a "campus" emergency-response service, one of two enterprise emergency-response services in this example. Service areas 2110 and 2120 (within civil service area 2100) and 2210 (within civil service area 2200) each represent, in one embodiment, a distinct campus of a corporation. There might be only one (or even none) in a given country, or there could be several within a large city. What differentiates these distinct campus service areas would be separate protection domains (i.e., separate response areas) covered by separate corporate-security phone numbers. Emergency phone calls to these corporate-security responders could involve intruder incidents or internal security breeches—corporate matters not to be handled by responders at the finest-granularity emergency-response service mentioned next. Even on matters that could be (and may eventually be) handled by civil responders, contacting corporate security personnel on the very campus where the user is located allows for shorter response times than civil emergency-response times.

Finally, the emergency-response service with the finest level of granularity, the "department" emergency-response service already mentioned, is another enterprise emergency-response service. It provides a finer mesh of responders and, therefore, potentially even shorter response times than the dedicated corporate security personnel that provide campus emergency-response service. For example, an enterprise can have corporate security provided by campus-level service area 2110, corresponding to a single emergency phone number. Within area 2110 are department-level service areas 2111 to 2117, each corresponding to a distinct emergency phone number.

As has already been mentioned, it is known how to compute a current location of device 100 with precision sufficient to determine which civil emergency-response service area the device is in and, therefore, to determine which emergency phone number to dial. It has further been mentioned that the small size of department-level service areas presents a much greater challenge in determining location with adequate precision. The inventor has realized that, if an enterprise has in place an electronic system that interacts with device 100 or something associated with it, data gathered by the system can directly or indirectly indicate the device's current location, often with precision sufficient to determine the correct department-level service area in which it is located. Candidate electronic location systems can be designed for different intended roles, yet still be adaptable to the aims of the present disclosure. An electronic access-control (EAC) system is intended to prevent a person from entering a given area without authenticating him- or herself to the system at one of certain electronic sentries. An electronic asset-tracking (EAT) system is intended to track the current location of items (typically of value or of a sensitive nature) on an enterprise's premises. The two different types of systems, if both present, can work together or even be integrated as a unified system. Additionally, the enterprise can provide short-range wireless network-access points, such as Wi-Fi base stations. Interaction of device 100 with any one of these access points can likewise indicate— to a certain extent—the location of the device.

Turning to FIG. 4, department-level service areas 2121 and 2122—with phones 2121a (extension 1-2-1) and 2122a (extension 1-2-2), respectively—are now shown in an enterprise context. Device 100 is presumed to be in the possession of authorized user 100u, who can additionally possess identification card 100c. Any of these three items (100, 100u, and 100c) can serve as a token, associated with device 100, that can interact with various fixed components of enterprise electronic location system 400. Such interaction can create "enterprise location data" indicative of the location of device 100. This data in turn can be used to determine which emergency phone number should be dialed when user 100u attempts to speed-dial for a (specific type of) enterprise emergency response.

Enterprise electronic location system 400 can comprise one or more of enterprise EAC system 460, enterprise EAT system 450, and enterprise wireless network-access system 440. Systems 460 and 450 are especially amenable to being incorporated into a single system (as indicated by the juxtaposition of EAC system control 460c and EAT system control 450c in FIG. 4). Each of systems 460, 450, and 440 contains hardware components as well as supporting/controlling software. In particular, some of the hardware components are fixed detectors that can detect the presence or proximity of complementary mobile tokens. Conceptually, each of these systems can be viewed as including the mobile tokens that interact with the fixed detectors. Moreover, detectors of one system can be viewed as components of another, co-operative system.

In the example depicted in FIG. 4, department-level service areas 2121 and 2122 are adjacent and connected by security portal 461d, which is one of the aforementioned fixed detectors of enterprise EAC 460. Security portal 461d comprises a barrier and an electronic sentry which "controls" (as will be explained shortly) whether the barrier can be opened. The barrier can be a door, a turnstile, a mantrap, or any other electronically controllable barrier suitable for selectively granting a person on one side of the barrier physical access to the other side of the barrier. Access is granted to the person upon successful authentication to the electronic sentry associated with the barrier, typically by electronically registering some sort of security token with the electronic sentry and authenticating the token. A security portal can autonomously grant access, but this typically requires that all identification cards for all users of the EAC system be user-agnostic (i.e., the EAC system cannot tell which identification card was used). More often, authentication of the token requires involvement by EAC system central control 460c to consult user-identity database 460d that associates authorized users with corresponding identification cards, pass codes, finger print data, etc.

Continuing in reference to FIG. 4, the type of electronic sentry and the corresponding security token can vary considerably. In one well-known arrangement, the electronic sentry is a scanner and the security token is identification card 100c, uniquely associated with (and presumed to be in possession of) authorized user 100u of device 100. Identification card 100c can contain, for example, a barcode for optical scanning by the electronic sentry, a magnetic strip for swiping in the electronic sentry, or a near-field communication (NFC) chip, such as an RFID tag or a smart-card chip, for proximity detection by the electronic sentry. Alternatively, device 100 can serve as a security token by containing proximity identification device 160 (of which only antenna 160a is shown in FIG. 4). A security token can be tied intimately to user 100u: It can be a biometric feature of the user, such as a fingerprint (to be scanned by a fingerprint reader at the electronic sentry), or it can be the user's secret pass code (to be entered on a keypad of the electronic sentry). Multi-factor authentication can be required. For example, user 100u can be required both to present identification card 100c and to enter a pass code. The reliability of the authentication regime is influenced by the number of authentication factors required and their type. For example, confidence that device 100 is present at a particularly electronic sentry is higher if the device itself is the security token than if identification card 100c is present at that particularly electronic sentry.

Service area 2121 has additional security portals 461a and 461c, similar to 461d, and service area 2121 has similar security portals 461b and 461e. In the present example, each of service areas 2121 and 2122 can be accessed only via its respective security portals. Thus, each service area forms a separate security zone. Access can be controlled on a per-user basis based on these security zones. For example, enterprise EAC system 460 can be configured to allow certain people access to one of these two security zones, but not the other. If, as in the present example, each security zone corresponds to a unique department-level emergency phone number, knowledge that device 100 is in a particular security zone is tantamount to knowledge of which emergency phone number should be dialed at the department level. In cases where an emergency-response service area comprises more than one security zone, knowledge that device 100 is in a particular security zone is still tantamount to knowledge of which emergency phone number should be dialed. Thus, it is desirable that each security zone coincide with or be entirely contained within a service area.

As is known in the art, if security portals 461a to 461e are linked to a centralized control 460c of enterprise EAC system 460, the EAC system can maintain a log of which security portal was engaged by which security token (and presumably its respective authorized user). The log can be stored in what is represented in FIG. 4 as asset-location database 450d of enterprise EAT system 450. A skilled person will appreciate that asset-location database 450d can be part of enterprise EAC system 460, or, as mentioned before, the two systems can be integrated. Enterprise location data associated with device 100 can be derived from entries in the log.

Alternatively, the enterprise can lack an EAC system entirely, yet enterprise EAT system 450 can track the location of a security token via, for example, an NFC device in the security token. In FIG. 4, this is depicted as wireless communication between RFID detector 451a and either of identification card 100c and antenna 160a of RFID device 160 (not shown in FIG. 4) in device 100. Such RFID detectors can be placed at points (such as 451a and 451b) other than entry points and/or at entry points. (Thus, portals 461a to 461e can merely detect the presence of a security token, without controlling access).

In some EAC systems, security portals (or a part of each) can control egress from a security zone; thus egress events can be logged in addition to access events. Likewise, an EAT system that continuously senses where an asset is (approximately) located can log when the system no longer senses that asset within range of any of its detectors. Similarly, an enterprise wireless network-access system can (in some circumstances) be aware that device 100 is beyond the range of all of its access points. As will be discussed later, knowing where device 100 is not located is also of value in determining an appropriate emergency phone number to dial.

Still in reference to FIG. 4, a skilled person will understand that enterprise location data associated with device 100 can vary in its granularity, timeliness, and/or reliability. Any of these factors can influence the usefulness of the data.

Granularity of enterprise location data can become problematic if the data only narrows down the presumed location of device 100 to an area that overlaps more than two service areas. One way this situation can arise is from an inadequate number, density, or distribution of points where device 100 (or something associated with it) can interact with EAC system 460, EAT system 450, and/or enterprise wireless network-access system 440. It is desirable to have each security zone coincide with or be entirely contained within a service area at the finest-grained level. As will be explained later, this enables correct determination of an emergency phone number, even for a coarser-level service.

Timeliness of enterprise location data can become problematic if the data is out of date, reflecting where device 100 was, at one point in time, but no longer is. One way this situation can arise is if EAC system 460 controls ingress to, but not egress from, security zones. If device 100 leaves one security zone without entering another one, the device's last-known security zone is no longer its current (null) security zone. It is desirable to have enterprise location data reflect both the comings and goings of device 100. As will be explained later, this improves the likelihood of determining an appropriate emergency phone number, even if device 100 is no longer in any enterprise security zone.

Reliability of enterprise location data can become problematic if the circumstantial link between the data and device 100 is tenuous from a security standpoint. One way this situation can come about is if device 100 is associated with authorized user 100u, whose identity badge 100c can be used (for example, if stolen) by another person using only one-factor authentication (without no requirement for biometric data, a pass code, etc.). It is desirable for device 100 to directly interact with EAC system 460, EAT system 450, and/or enterprise wireless network-access system 440, for example via proximity identification device 160 or short-range communications subsystem 140. Even so, there is the possibility that location can be "spoofed" if, for example, a person uses device 100 (or other security token) to electronically engage a particular security zone at one of its security portals, but does not then pass through that portal into the security zone. Some systems, such as EAC systems employing mantraps and EAT systems that continuously track assets, are not susceptible to this kind of ruse.

Figure 5:
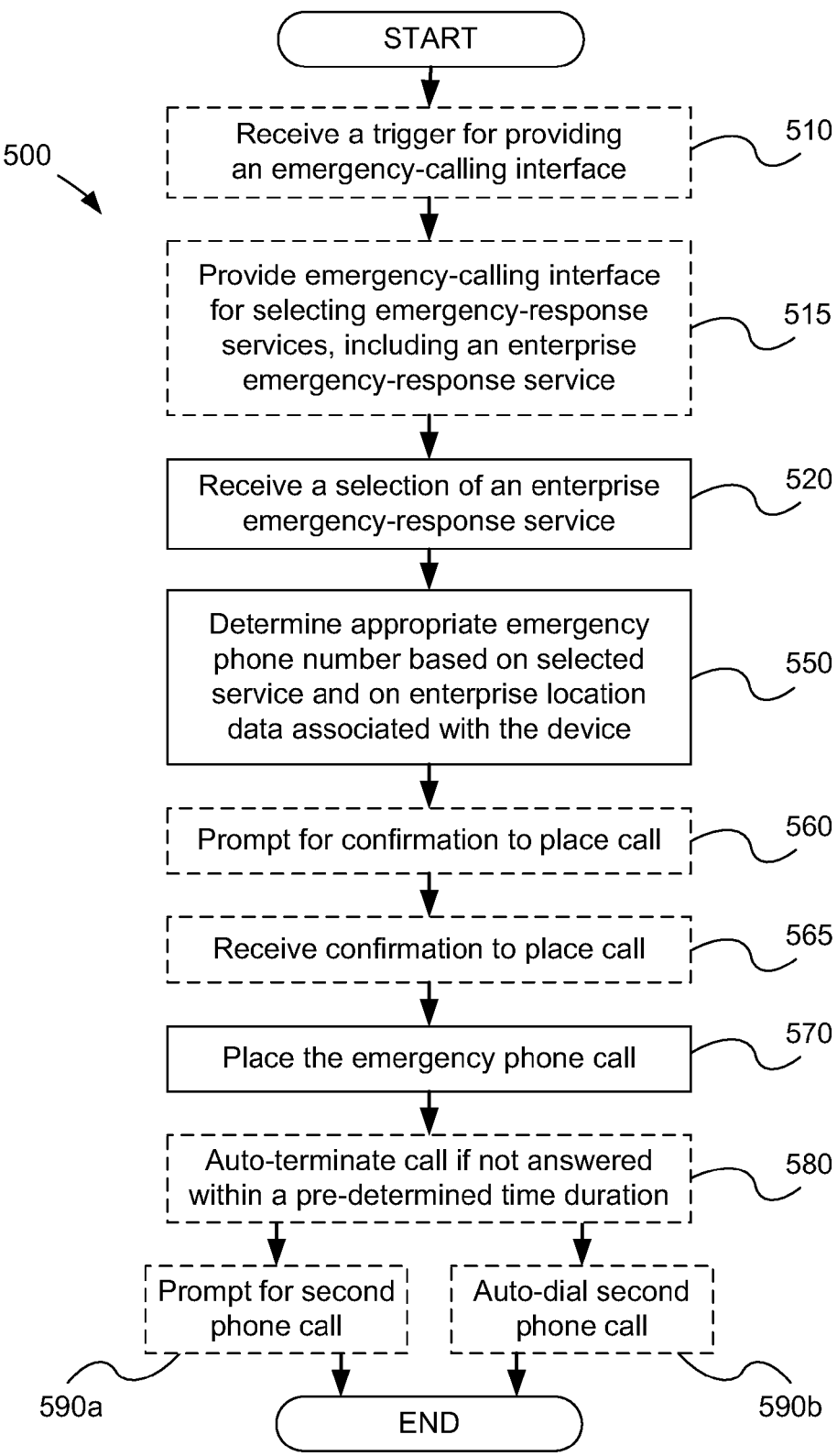
FIG. 5 is a flowchart for a method of placing an emergency phone call to an enterprise.

Now in reference to FIG. 5, a flowchart is provided depicting method 500 for placing an emergency phone call based on the selection of an enterprise emergency-response service from amongst two or more user-selectable emergency-response services. Optional steps are indicated by dashed outlines.

At optional step 515, an emergency-calling interface, e.g., a graphical user interface (GUI) is rendered on display 140 of device 100, providing the user with the option to select from amongst two or more emergency-response services. Optionally, this interface can be invoked as a result of the device receiving, at step 510, a triggering event. The triggering can be, by way of example: the removal of device 100 from a holster while the device is in a locked state or unlocked state; the depression of trackball 195, a thumbwheel, a depressible optical navigation pad, or a designated key at the device; or the inputting, at the device, of a sequence of keys representative of an emergency phone number. For example, if device 100 is in the "home screen" state (wherein icons for at least some of the user-launchable applications on the device are displayed, but no such the applications are currently running), pressing the sequence of keys that would ordinarily dial 1-1-2 can be recognized as an emergency phone number for the European Union (or on GSM phones generally). This can trigger the display of an emergency-calling interface, even if device 100 is in a region served by a different civil emergency phone number, such as 9-1-1.

Figure 9:
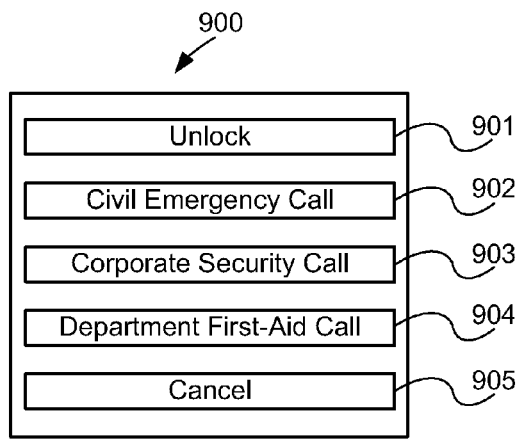
FIGS. 9, 9A, 9B, and 9C are screenshots of various emergency-calling graphical user interfaces that could be presented in different circumstances and according to different embodiments.

A very common scenario is that an emergency arises while device 100 is not actively being used. In fact, it can be in a "locked" state. In the art, a locked state is understood to mean that substantially all functionality of the device is disabled. Unauthorized use of the device is prevented. An authorized user would authenticate him- or herself to the device by entering a password or by some other procedure. FIG. 9 depicts an exemplary emergency-calling GUI 900 that, in some embodiments, is presented to a user of device 100 when it is pulled out of a holster in a locked state. To gain full access to the functionality of device 100, the authorized user would, in some embodiments, first select "Unlock" option 901 and click an input device (such as a trackball 195, thumbwheel, depressible optical navigation pad, or designated key of the device) to invoke a password-input dialog. Alternatively, if device 100 has a touchscreen (not shown) in lieu of display 180, the user can touch (or, if the touchscreen is depressible, click) on "Unlock" option 901 to invoke a password-input dialog directly.

However, in appreciation of the fact that in a true emergency, speed is of the essence, device 100 is often configured so that even an unauthorized user of the device can perform the limited functionality of placing an emergency phone call. Therefore, it is known in the art to provide an option at the locked screen to initiate an emergency phone call. It is further known that an unauthorized user of device 100 could potentially place an unwarranted emergency phone call as a prank, perhaps to create the impression that a prank was committed by the person authorized to use the device. However, the benefits to society of allowing immediate access, even if unauthorized, to emergency-calling functionality is generally considered to outweigh the risks of prank emergency phone calls.

A skilled person will understand that a variation (not shown) of emergency-calling GUI 900—without "Unlock" option 901—can be presented at step 515 if device 100 is already in an unlocked state.

In the present disclosure, emergency-calling GUI 900 provides the user 100u of device 100 the opportunity to choose from amongst more than one option for placing an emergency phone call, at least one of the options being for an enterprise emergency-response service. In some embodiments, "Civil Emergency Call" option 902—the coarsest-granularity, civil level—allows any user to initiate an emergency phone call to civil responders; in one such embodiment, this would result in dialing 9-1-1 in North America and other appropriate emergency phone numbers in respective large geographic regions. Similarly, choosing "Corporate Security Call" option 903—the intermediate-granularity, campus level—would result in a phone call to the local corporate security department or contractor, and choosing "Department First-Aid Call" option 904—the finest-granularity, department level—would result in a phone call to the closest first-aid provider. "Cancel" option 905 would, in some embodiments, close emergency-calling GUI 900.

Returning to FIG. 5, at step 520, device 100 receives from user 100u of the device a selection of one of the emergency-response services. In some embodiments, the caller uses a navigational input, such as trackball 195, a thumbwheel, or one or more arrow keys to tentatively choose the desired level (which, conventionally is highlighted in some fashion, as is known in the art) Then a second input, such a depression of trackball 195, a thumbwheel, a depressible optical navigation pad, or a designated key, finalizes the choice so that device 100 would recognize that a selection has been made by the user. If the well-known civil emergency-response service is selected, the method proceeds according to previous disclosures in the art (not shown). The present disclosure describes only cases when an enterprise emergency-response service is selected.

At step 550, an emergency phone number is determined based on the selected enterprise emergency-response service and location data from enterprise electronic location system 400. It has been anticipated that this determination can be been made in a wide variety of ways, the range of which will be illustrated by specific examples detailed later.

Still in reference to FIG. 5, at step 570, the emergency phone call is placed. It is known in the art to require from the user additional, confirmatory action to preclude a user's inadvertently initiating an emergency phone call by an inopportune combination of accidental user inputs, for example accidentally depressing trackball 195, a thumbwheel, a depressible optical navigation pad, or a designated key while an emergency-calling option happens to be highlighted. Thus, in some embodiments, step 570 would only be performed after, at optional step 560, the user is prompted to confirm that a phone call (according to the emergency-response service selected) is truly to be made, and, at companion step 565, confirmation to place said phone call is received. A conventional implementation of step 560 is to invoke a dialog (not shown) asking the user whether he or she really wishes to place an emergency phone call, to which user 100u can respond by selecting "Yes" or "No." Typically, "No" is given focus and is highlighted by default to reduce the chances of "Yes" being accidental selected. In some embodiments, this prompt for confirmation can have a generic form, independent of the emergency-response service selected. In other embodiments, to more explicitly inform user 100u, the prompt displayed is a service-specific version indicative of the emergency-response service selected (cf. alternative step 560a of FIG. 12).

Eventually, the emergency phone call will be terminated. At optional step 580, termination can be brought about automatically if the phone call is not answered within a pre-determined time duration. This automatic action is performed on behalf of a user of device 100 on the presumption that "nobody's home"—not an unreasonable assumption when the intended recipient of the emergency phone call is an individual employee who doubles as a first-aid responder or even if a corporate security post is staffed by a single individual. Auto-termination is especially useful when combined with auto-dialing of a second phone number, as will be described later.

Regardless of whether automatic termination of the emergency phone call is performed at optional step 580 or some other kind of call termination takes place, two optional features can be implemented. In one alternative embodiment, at optional step 590a, an emergency-calling GUI re-appears to enable a user of device 100 to place a second phone call, for another emergency-response service. In another alternative embodiment, at optional step 590b, an additional phone number is dialed automatically by device 100.

Step 590a of FIG. 5 is an implementation choice based on the assumption that a second emergency phone call after the first one, regardless of the outcome of that first phone call, may be desired. The first phone call might end with a successful communication of what was being requested, but it may be desirable to summon back-up help or more-skilled help. The first phone call might end because the caller gets no response and gives up. In one embodiment, after a pre-determined time duration with no response, the phone call would be automatically terminated at step 580. Various exemplary implementations of step 590a of FIG. 5 are illustrated as the emergency-calling GUIs of FIGS. 9, 9A, 9B, and 9C, each designed for situations in which device 100 is in a locked state. A skilled person will understand that appropriate variations of those emergency-calling GUIs—without "Unlock" option 901—can be presented at step 590a if device 100 is already in an unlocked state.

FIG. 9 shows a screen shot of exemplary emergency-calling GUI 900, previously described in reference to step 515, when an emergency phone call is being placed for the first time. In one embodiment, the very same screen can be presented to a user of device 100 at step 590a, to enable him or her to place a second phone call. In other embodiments, the subsequent emergency-calling GUI presented would not list an option that had previously been selected, thereby simplifying the choices for the user who may be in a highly stressful situation. This can actually be implemented in various ways, as will be described in reference to FIGS. 9A to 9C.

Figure 9A:
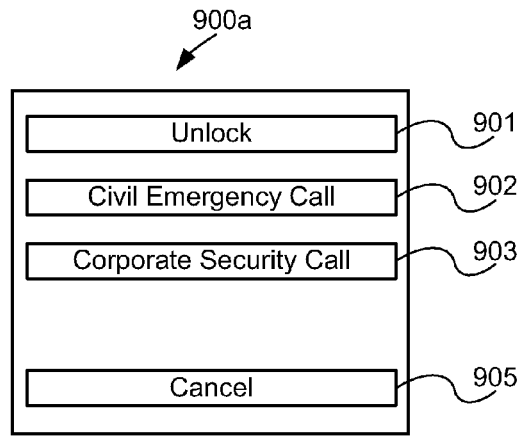
Figure 9B:
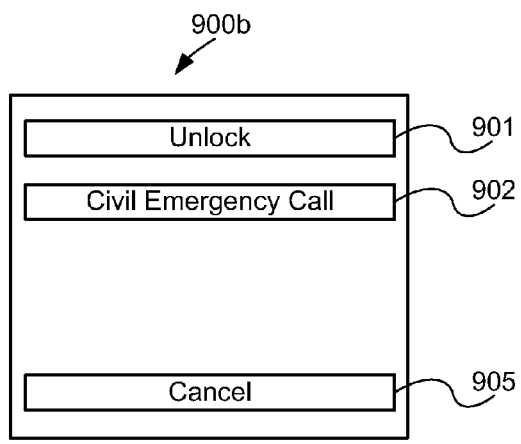

For some embodiments in which the various emergency-response services are ranked from highest (e.g., coarsest-granularity) to lowest (e.g., finest-granularity) as mentioned before, only higher-ranked unused options are presented in a subsequent emergency-calling menu. Consider the situation in which a chemical spill occurs in a lab, injuring an employee. The first concern is to summon the nearest first-aid provider by choosing "Department First-Aid Call" option 904 in FIG. 9. As shown in FIG. 9A, that option would be deleted from a further emergency-calling GUI 900a. The next concern would be to notify corporate security to evacuate the immediate area, perhaps the building; this would be done by choosing "Corporate Security Call" option 903 in FIG. 9A. As shown in FIG. 9B, that option would be deleted from still further emergency-calling GUI 900b. The final concern would be to alert civil authorities that a chemical-cleanup response team is needed and perhaps ambulance service for the injured employee; this would done by choosing "Civil Emergency Call" option 902. A full, multi-level menu could be restored after this third phone call, or by any of the invoking triggers mentioned earlier. Note that under this approach, emergency-calling GUI 900b would be presented as the second GUI if the first option selected was "Corporate Security Call" option 903 in FIG. 9.

Figure 9C:
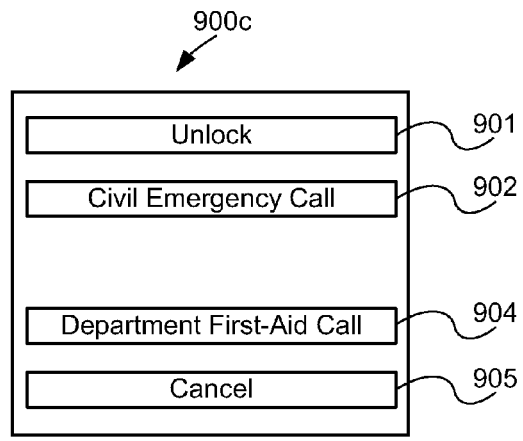

FIG. 9C illustrates an alternative embodiment in which all unused levels are presented, regardless of ranking; in fact, the levels need not be ranked at all for this approach. After an initial "Corporate Security Call" (placed by selecting option 903 of FIG. 9) was terminated (for whatever reason, in whatever manner), subsequent emergency-calling GUI 900c lacks only the previously selected option. Thus in this embodiment, even though there is an inherent ranking (viz., by granularity) of the levels, the caller has the option to go up or down in rank to place a second phone call. For example, a caller who gives up trying to reach corporate security can next resort to either the nearest first-aid provider or a civil responder.

FIGS. 9A, 9B, and 9C have been formatted for illustrative purposes to emphasize the deleted emergency-response service(s). It will be understood that a user-interface designer of ordinary skill can implement a reduced collection of options spaced in a uniform, aesthetic fashion.

It is anticipated that in other embodiments, a non-emergency phone-dialing interface (not shown) or a personalized list (not shown) of special contacts (e.g., personal doctor, next of kin, etc.) can be presented at step 590a.

Returning again to FIG. 5, after a first emergency phone call at a first level is terminated for whatever reason, a second emergency phone call can, at step 590b, be dialed automatically at another level designated as the alternate level for the first level called. This has the advantage that if, for example, an injured employee tries to call the nearest first-aid provider and does not succeed, after a predetermined time duration, the first phone call can be automatically terminated (at step 580), and then a second phone call to a civil responder can be initiated. The civil call-centre will likely be able to find an approximate location for the source of the second phone call, even if the caller was only able to select "Department First-Aid Call" option 904 and was never able to say a word.

It is anticipated that in other embodiments, a pre-determined second phone number (e.g., personal doctor, next of kin, etc.) can be automatically dialed at step 590b. This second phone number can be associated with the level at which the first phone call is placed or can be the same for all levels.

Precisely how subsequent phone calls are enabled at step 590a or are auto-dialed at step 590b can, in some embodiments, be configured by a user of device 100 and or by an external party (either during or subsequent to provisioning of the device).

Continuing in reference to FIG. 5, there are numerous ways to determine, at step 550, the emergency phone number to be dialed, based on the selected emergency-response service (level) and on enterprise location data associated with device 100. For example, the determination can be made by means of emergency-calling look-up table 125. Such a look-up table can be specific to the emergency-response service selected; embodiments using a service-specific look-up table are described in reference to FIGS. 6A, 7A, and 7B. Alternatively, the look-up table can be specific to location data associated with device 100; embodiments using a location-specific look-up table are described in reference to FIGS. 6B and 8.

Figure 6A:
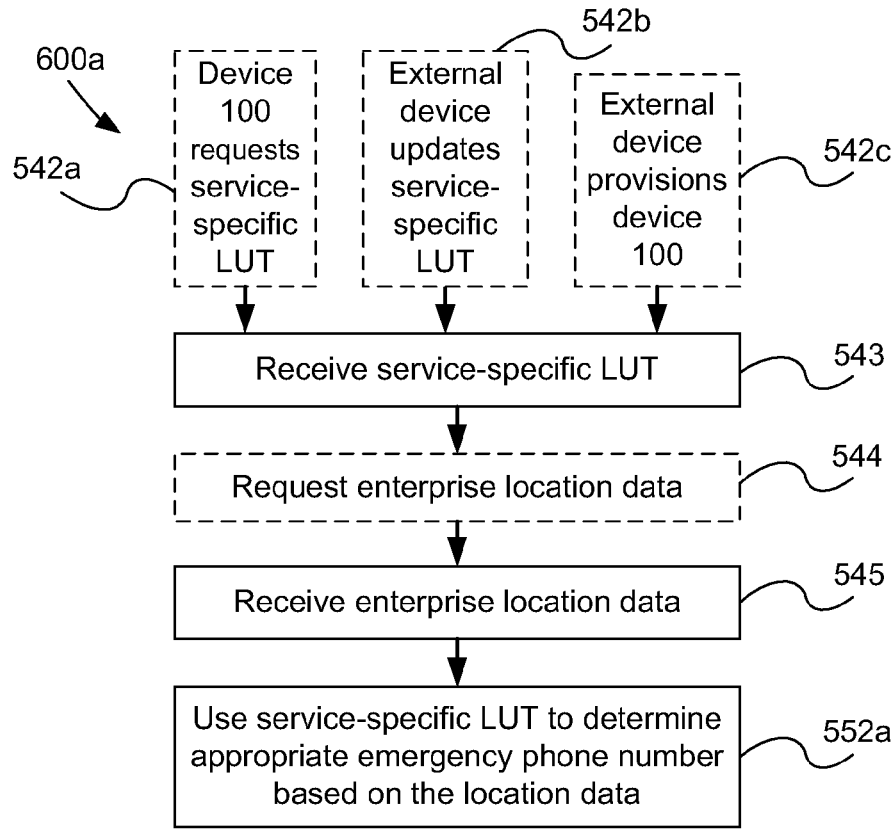
FIGS. 6A and 6B are flowcharts for alternative implementations of a portion of the method of FIG. 5.

Referring to FIG. 6A, a flowchart is shown depicting method 600a of implementing step 550 of FIG. 5. Steps 542a/b/c to 545 can be preformed prior to step 550, whereas step 552a can be performed as a sub-step of step 550. Emergency-calling look-up table 125 is received by device 100 at step 543, typically through a data communication channel, as a service-specific look-up table. FIG. 7A depicts a portion of exemplary look-up table 710, which is specifically for mapping locations (service areas) to phone numbers for corporate security. FIG. 7B, on the other hand, depicts a portion of exemplary look-up table 720, which is specifically for mapping locations (service areas) to phone numbers for department first aid. Each of tables 710 and 720 is depicted with mnemonic indices in the left column. A skilled person will understand that these are for illustrative purposes only, to convey to the reader of the present disclosure the role each index plays. In practice, any sort of indexing system can be used, as is known in the art. Likewise, the column headings are present merely for conveying to the reader of the present disclosure the role each column plays.

Reception of service-specific look-up table 125 at step 543 can be in the form of a reply to a request, at step 542a, by device 100 to an external device; in this situation, the table is said to be "pulled" by device 100. The request can be to an external device of an enterprise associated with device 100 (or authorized user 100u) and/or to a device of some other party. For example, emergency-calling look-up tables 710 and 720 can be requested from the enterprise that would have the relevant enterprise-related information, whereas a look-up table (not shown) for civil emergency-calling can be requested from an Internet service provider (ISP) that provides data-communication service for device 100 or from any party cognizant of the relevant information. Requests to different entities can come substantially simultaneously or at significantly different times. A request at step 542a can be made in response to reception, at step 510, of a triggering event for providing an emergency-calling GUI or even as late as reception, at step 520, of a selection of an emergency-response service. In the latter case, the sole look-up table needed can be requested at step 542a. In fact, device 100 need only store whichever service-specific look-up table is needed. Alternatively, device 100 can always store a service-specific look-up table for each emergency-response service (level), thereby eliminating any delay in receiving a table when needed.

Alternatively, reception of service-specific look-up table 125 at step 543 can be the result of an updated look-up table being "pushed" to device 100 (without a request from device 100), at step 542b, by an external device as part as part of an over-the-air (OTA), possibly periodic, updating of device 100. The pushed update can come from an external device of an enterprise associated with device 100 (or authorized user 100u) and/or from a device of some other party. For example, emergency-calling look-up tables 710 and 720 can be pushed by the enterprise that would have the relevant enterprise-related information, whereas a look-up table (not shown) for civil emergency-calling can be pushed an ISP or any party cognizant of the relevant information. Pushes of updated look-up tables by different entities will likely come at different times, on an as-needed basis. For example, an enterprise might push an update if a new building or campus is occupied. An ISP might push an update if one country changes its civil response phone number to harmonize with neighbouring countries.

In yet another alternative embodiment, reception of service-specific look-up table 125 at step 543 can take place as part of a provisioning of device 100 at step 542c. The provisioning can be done by a manufacturer of device 100, a vendor of the device, an ISP providing data-communication service for the device, or an enterprise associated with the device. It is anticipated that provisioning can take place in stages. For example, basic functionality can be provisioned by the manufacturer, with more specific functionality and data provided by other entities. Thus, the manufacturer can provision a civil emergency-response look-up table, and the enterprise can later provision one or more look-up tables for respective enterprise emergency-responses services.

Continuing in reference to FIG. 6A, enterprise location data is received by device 100 at step 545 and used at step 552a to look up the emergency phone number in service-specific look-up table 125. The form of the data received at the former step determines how the latter step is performed. A very simple scheme is to receive an index for looking up the appropriate phone number in look-up table 125. Alternatively, the location data can be received in a more "raw" form, such as co-ordinates, which must then be converted at device 100, by means of an algorithm and/or additional look-up table, into an appropriate index for using look-up table 125. Although step 545 is shown sequentially after step 543, a skilled person will appreciate that these two steps could be performed in the opposite order.

Reception of enterprise location data at step 545 can come in the form of a response to a request sent, at optional step 544, from device 100 to an external device, such as an enterprise device cognizant of the information needed. Alternatively (in steps not shown, but analogous to steps 546b and 547b of FIG. 6B., discussed next), an external device, typically one associated with enterprise location system 400, can detect a change in enterprise location data associated with device 100 and push the revised enterprise location data to the device.

Figure 6B:
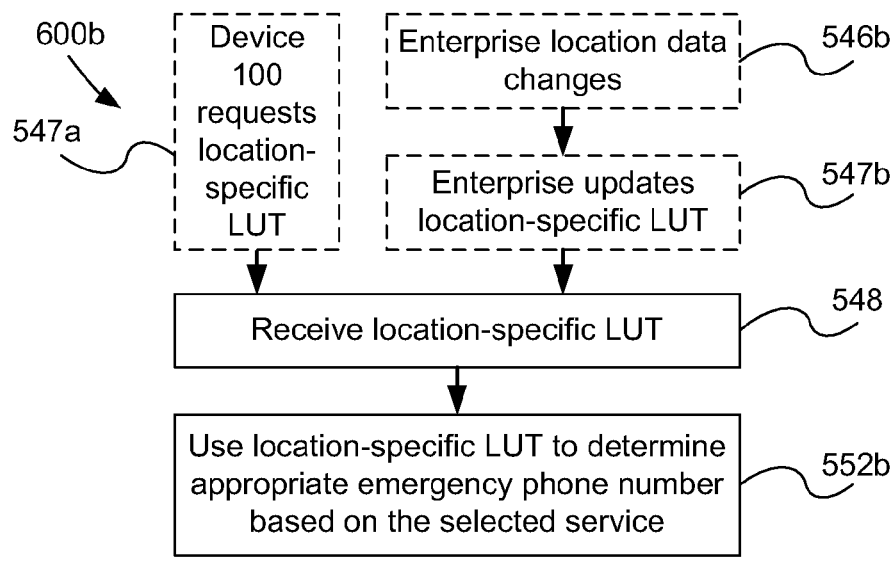

Turning now to FIG. 6B, a flowchart is shown depicting alternative method 600b of implementing step 550 of FIG. 5. Steps 547a, 546b, 547b, 547, and 548 can be preformed prior to step 550, whereas step 552b can be performed as a sub-step of step 550. Emergency-calling look-up table 125 is received by device 100 at step 548, typically through a data communication channel, as a location-specific look-up table. FIG. 8 depicts an exemplary table 800, which is specifically for mapping emergency-response services to phone numbers. As in FIGS. 7A and 7B, the presence of the column headings and the mnemonic form of the indices in the left column of table 800 are merely for conveying to the reader of the present disclosure the role each column plays and the service each index represents.

In method 500 of FIG. 5, the determination of an emergency phone number at step 550 is dependent on two factors: the location of device 100 and the emergency-response service selected. In method 600b of FIG. 6B, the more challenging factor to compute—location—is already implicit in the look-up table, such as table 800, received at step 548. Using the received location-specific look-up table at step 552*b* to look up the appropriate emergency phone number can be done directly based on the emergency-response service selected.

Continuing in reference to FIG. 6B, location-specific look-up table 125 is based on a current location of device 100 determined by some means. Obviously, the validity of the data in such a table depends on the accuracy of the determined current location. If the true current location differs significantly from the determined current location, an inappropriate emergency phone number might inadvertently be determined at step 550. Thus, it is desirable to update location-specific look-up table 125 whenever the true current location of device 100 changes enough to invalidate the table.

Location-specific look-up table 125 can be pulled by device 100 by requesting, at step 547*a*, the table from an external device. Typically, the external device would be associated with the enterprise that would be cognizant of the enterprise-related data in the table (and would, be responsible for conveying the civil-level data, as well). The request at step 547*a* could be done by periodically polling the external device or by requesting an update when device 100 detects a potentially consequential change in its location. Device 100 may detect such a change by a variety of means including, but not limited to: contact with enterprise EAC system 460 (e.g., at security portal 461*c*); contact with enterprise EAT system 450 (e.g., at RFID detector 451*a*); change in connection status with a short-range wireless network-access point (e.g. going out of range of Wi-Fi access point 441); change in connection status with a data and/or cellular network (e.g., being passed off from base station 240*a* to base station 240*b*); and change in location as computed by GPS Navigation application 124.

It is anticipated that a location-specific look-up table can contain a null or other special entry to indicate that no specific phone number is available for a particular emergency-response service given the current (presumed) location of device 100. Various solutions will be discussed later for handling situations when a service is selected, but no phone number corresponding to the selected service is likely to be appropriate.

Alternatively, location-specific look-up table 125 can be pushed to device 100 at step 547*b*, by an external device, such as a device of the enterprise that would be cognizant of the enterprise-related data in the table. This could be done periodically or when the enterprise detects, at step 546*b*, a potentially consequential change in the location of device 100. Consider the following exemplary scenario: Security portal 461*c* detects identification card 100*c* and receives entry of a pass code associated with user 100*u*. Enterprise EAC system 460 verifies the identification card 100*c* and the entered pass code based on identity information stored in user-identity database 460*d*. Enterprise EAC system 460 then enables security portal 461*c* to grant access (presumably) to user 100*u* to service area 2121. Enterprise EAC system 460 also updates asset-location database 450*d* with the (presumed) location of user 100*u* and device 100. Enterprise EAT system 450 (or another software module) then conveys to device 100, via Internet 200, location-specific look-up table 800, with the appropriate, newly updated emergency phone number (viz., extension 121) for department service area 2121. Thus, device 100 is automatically updated with the only emergency-response phone numbers it needs, as soon as "it" (more precisely, one or more tokens associated with it) engages an enterprise device at a fixed location known to an enterprise system.

Figure 10:
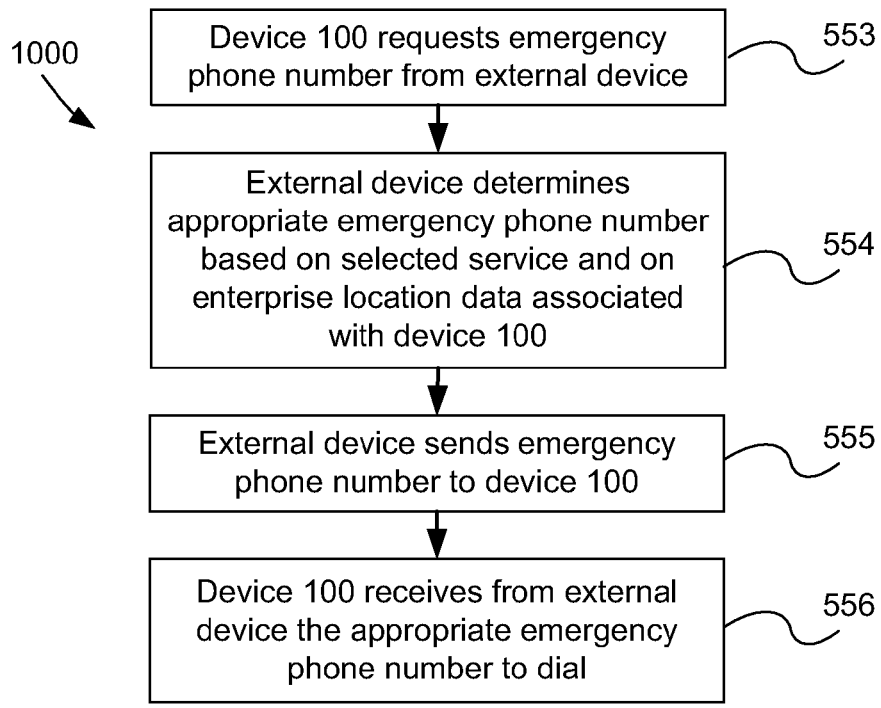
FIG. 10 is a flowchart for one alternative implementation of a portion of the method of FIG. 5, wherein the emergency phone number is determined externally to the device of FIG. 1.

Although step 550 of FIG. 5 has so far been exemplified as taking place at device 100, it is anticipated that, alternatively, the step of determining the appropriate emergency phone number to dial based on enterprise location data associated with the device can be performed off the device. In particular, FIG. 10 provides a flowchart depicting method 1000 for externally determining an emergency phone number based on the selected emergency-response service and on enterprise location data associated with the mobile communication device. At step 553, device 100 requests the emergency phone number from external device (possibly an enterprise device), communicating which emergency-response service was selected. In response, the external device determines, at step 554, the appropriate emergency phone number based on the selected service and on enterprise location data associated with device 100 and known to the external device. At step 555, the external device sends to device 100 the requested emergency phone number. Finally, at step 556, device 100 receives the appropriate emergency phone number from the external device.

Figure 11:
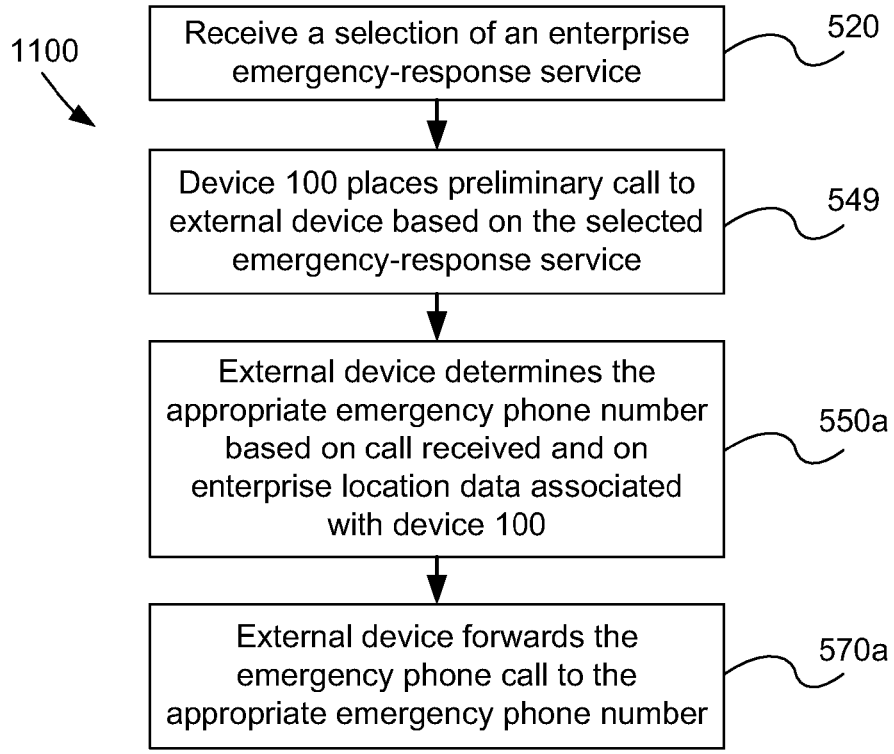
FIG. 11 is a flowchart for another alternative implementation of a portion of the method of FIG. 5, wherein the emergency phone number is determined externally to the device of FIG. 1.

Although step 570 of FIG. 5 has so far been exemplified as taking place at device 100, it is anticipated that, alternatively, the step of placing the emergency phone call can be a two-step process. In particular, FIG. 11 provides a flowchart depicting method 1100 for placing a preliminary call to an external device (possibly an enterprise device), which phone call is then forwarded appropriately. Specifically, at step 520, a selection of an enterprise emergency-response service is received as user input at device 100, exactly as in method 500 of FIG. 5. Now, however, at step 549, device 100 places a preliminary phone call to an external device, based on the emergency-response service selected. For example, a different, respective number (or extension) can be dialed for each service. In one variation, a single phone number can be dialed, followed by transmission of a predetermined DTMF tone indicative of the selected service once the preliminary phone call is connected; this is equivalent to dialing a different, respective extension for each service. At step 550*a*, the external determines the appropriate emergency phone number based on the selected service and on enterprise location data associated with device 100 and known to the external device. Finally, at step 570*a*, the external device forwards, in a manner known in the art, the preliminary phone call from device 100 to the appropriate emergency phone number.

Returning to FIG. 3, civil emergency-response areas 2100 and 2200 are shown as being separated, but can be contiguous. Even so, the planet is not fully covered by emergency-response areas. Attempting to dial a universal emergency-response phone number (typically of the three-digit variety) while in the middle of an ocean will result in no phone call being successfully placed (unless something other than cellular technology is in use). Of course, this unsuccessful outcome should come as no surprise to a user of device 100 who makes such an attempt.

Similarly, campus-level service areas 2110 and 2100 do not cover all of civil emergency-response area 2100, which can be an entire country. An enterprise's campuses will never encompass an entire country, yet an enterprise employee may have a reasonable expectation of being able to speed-dial the "appropriate" enterprise campus when he or she is near, but not within it. Likewise, department-level service areas 2111 to 2117 can fail to cover all of campus service area 2110, yet an employee who is between enterprise buildings but within an enterprise campus may have a reasonable expectation of being able to speed-dial the "appropriate" department-level service area when he or she is near, but not within it.

Thus, unlike with systems for speed-dialing a civil emergency-response phone call, it is particularly desirable for a system of speed-dialing an enterprise emergency-response phone call to detect and adapt to situations in which determining an emergency phone number based solely on the selected service and on enterprise location data associated with device 100 could result in a phone number being dialed that is inappropriate or less than optimal under the circumstances. Detecting and adapting to such "location anomalies" are two separate, but not entirely unrelated problems.

Figure 12:
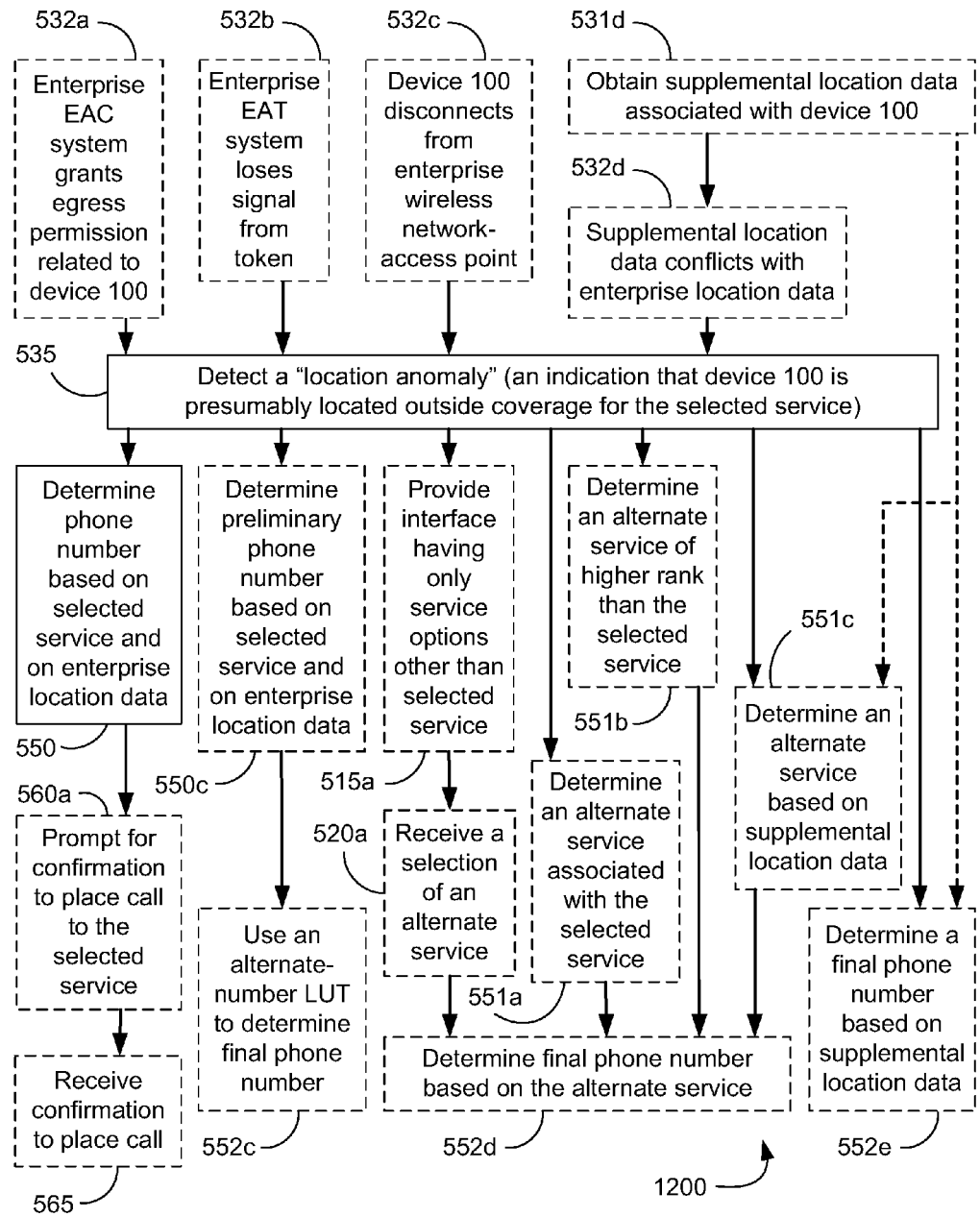
FIG. 12 is a flowchart for yet another alternative implementation of a portion of the method of FIG. 5, performed if the device of FIG. 1 is presumed to have moved outside coverage of the selected emergency-response service.

Both problems are addressed by method 1200, depicted by the flowchart in FIG. 12. At pivotal step 535, a location anomaly is detected, i.e., an indication that device 100 is presumably located outside coverage for the emergency-response service selected. In other words, there is circumstantial evidence that device 100 may not be within any service area for the selected emergency-response service. Feeding into step 535 are various conditions that could occur and that could, at step 535, be detected as indicative that device 100 may be located outside coverage for the emergency-response service selected; detecting such location anomalies is the first aforementioned problem. Subsequent to step 535 are various courses of action that can be taken if a location anomaly is detected; adapting to such a circumstance is the second aforementioned problem.

Solving the problem of detecting location anomalies depends on a crucial characteristic of enterprise location system 400. In some embodiments, enterprise location system 400 can, by design, automatically determine when device 100 has (presumably) left the service area it most recently visited. In other embodiments, the enterprise location system—by itself—can only determine when the device has entered a service area.

We first consider embodiments in which enterprise location system 400—by itself—is "egress-aware" in the sense that the system can track both the comings and goings of device 100. In some embodiments, the enterprise location data used to determine the appropriate emergency phone number at step 550 is based on enterprise EAC system 460. In some cases, EAC system 460 not only grants access permission for a person, such as authorized user 100*u* of device 100, to enter a certain security zone, but also grants egress permission for a person to leave the same security zone. More precisely, the person is not allowed to leave the security zone without again authenticating him- or herself to the system at a security portal such as 461*a*. In some circumstances, user 100*u* may leave one security zone and immediately enter another security zone. A location anomaly occurs at step 532*a* if, instead, user 100*u* (and, presumably, device 100) leaves one security zone without entering another one. If asset-location database 450*d* logs who is granted access to and egress from which security zones, the condition that user 100*u* is (presumably) no longer in any enterprise security zone can be detected at step 535.

In other embodiments, the enterprise location data used to determine the appropriate emergency phone number at step 550 is based on enterprise EAT system 450. In some cases, EAT system 450 continuously tracks a token associated with device 100, in any of the manners described previously, while the token is within range of enterprise premises. A location anomaly occurs at step 532*b* if EAT system 450 loses a signal from the token, presumably because user 100*u* and device 100 travel beyond a certain range of the EAT system. The condition that user 100*u* is no longer within range of any asset-tracking detector of EAT 450 can be detected at step 535.

In still other embodiments, the enterprise location data used to determine the appropriate emergency phone number at step 550 is based on interaction between device 100 and enterprise wireless network-access system 440, of which wireless access point 441 is a part. Even if the enterprise wireless network-access system 440 is not used as a continual communication channel for device 100, either of the device and the system can be configured to periodically pole the other to determine enterprise location data associated with the device. As with EAT system 450, a location anomaly occurs at step 532*c* if the wireless network-access system loses contact with a token, in this case device 100 itself—either because the device has disconnected from an enterprise wireless access point (without then pairing with another one) of the system or because a polling event (by either party) fails. The condition that device 100 is, presumably, no longer within range of any enterprise wireless access point can be detected at step 535.

At each of steps 532*a*, 532*b*, and 532*c*, an event occurs that is detected at step 535 as circumstantial evidence that device 100 is no longer in any service area corresponding to the enterprise emergency-response service selected. The evidence is circumstantial in that device 100 may, in some circumstances, still be in a service area. For example, in reference to step 532*a*, user 100*u* might use identification card 100*c* to obtain egress permission at security portal 461*c*, but never actually leave security zone/service area 2121. As another example, in reference to step 532*b*, EAT system 450 might be tracking identification card 100*c* of user 100*u* while the card or device 100 is in the possession of someone other than the authorized user of these. A skilled person will appreciate that the more direct the association between device 100 and the enterprise location data associated therewith, the more reliable is the determination made at step 535.

Continuing in reference to FIG. 12, we now turn to embodiments in which enterprise location system 400—by itself—can only determine when the device has entered a service area, not when it has left one. One design strategy for such a system is to always determine the emergency phone number based on the most-recently engaged security zone; in other words, none of the paths in method 1200 is taken. This approach is based on the assumption that user 100*u* would not summon departmental help unless he or she were still within or near a department-level service area.

Another design strategy for an "egress-agnostic" system is to always obtain, at step 531*d*, supplemental location data associated with device 100 to confirm the (fine-grained) enterprise location data is still plausible. Such supplemental location data can be a geographic indicator received via GPS subsystem 150 and processed by GPS navigation application 124. As mentioned previously, acquisition of GPS data can be too slow to initiate once user 100*u* has requested an emergency phone call. Consequently, such GPS data can be whatever GPS data was most recently acquired, incidentally or on a periodic basis. Alternatively or additionally, supplemental location data can be a geographic indicator transmitted from a wireless access point accessed by device 100. The wireless access point can be a public base station such as 240*a* or 240*b* of FIG. 2. If the enterprise location data is not based on an enterprise wireless network-access system, then the supplemental location data could be based on such a system.

Regardless of how supplemental location data is obtained at step 531*d*, a location anomaly occurs at step 532*d* if the supplemental location data is in conflict with the enterprise location data. Suppose, for example, that asset-location database 450*d* provides location data—based on a most recent engagement of identification card 100*c* of user 100*u* with security portal 461*c* of EAC system 460—indicating that device 100 is (presumably) in department-level service area 2121, i.e., the Legal Department portion of the fifth floor of Building 30 at the enterprise's Waterloo campus. On the other hand, a beacon frame transmitted by wireless access point 240*a* indicates the device 100 is in Mississauga, not Waterloo. This may be because EAC system 460 is incapable of tracking egress by user 100*u*. But it could be because device 100 is in the possession of someone who is in a different location than its authorized and presumed user 100*u*. Regardless of the circumstances that cause supplemental location data to conflict with enterprise location data, this discrepancy is detected at step 535. The determination that a location anomaly exists can be based, for example, on a known mapping from possible values for enterprise location data to possible geographic indicators.

Returning yet again to FIG. 5, in various embodiments, step 550 (determining the appropriate emergency phone number based on the selected emergency-response service and on enterprise location data associated with device 100) is performed so as to adapt to the detection, at step 535 of FIG. 12, of an indication that the device is (presumed) to be located outside coverage for the selected emergency-response service. The simplest adaption to a location anomaly is to replace optional steps 560 and 565 of FIG. 5. In FIG. 12, at alternative step 560*a* a prompt is provided for confirmation that the phone call is to be placed to the specific, selected emergency-response service (as opposed to a generic, service-independent prompt for confirmation to place an emergency phone call). The prompt can explicitly indicate that the user appears to outside coverage for the selected emergency-response service. At step 565, confirmation to place the phone call is received, exactly as in FIG. 5. Only then is the emergency phone call placed at step 570 of FIG. 5.

Continuing in reference to FIG. 12, in other embodiments of the method and system disclosed, method 1200 provides various ways of determining an alternate phone number other than the phone number that would ordinarily be determined based on the selected emergency-response service and on enterprise location data associated with device 100. These embodiments are designed on the assumption that there is a phone number more appropriate than the one that would ordinarily be determined.

In one embodiment according to method 1200 of FIG. 12, at alternative step 550*c*, a preliminary phone number is determined exactly as it would ordinarily be determined based on the selected emergency-response service and on enterprise location data associated with device 100. Then, at step 552*c*, an alternate-number look-up table (not shown) is used to determine the final phone number based on the preliminary number. Such a look-up table can be configured based on input from user 100*u* and/or from an external device, especially an enterprise device. Input from an external can either be pulled by or pushed to device 100. A user interface (not shown) can be provided for user input for the alternate-number look-up table, possibly to override externally provided information. For example, information provided by the enterprise might specify that the alternate phone number for a "Department First-Aid Call" to the Legal Department portion of the fifth floor of Building 30 at the enterprise's Waterloo campus be the phone number for a "Corporate Security Call" to the enterprise's Waterloo campus. User 100*u* might prefer to have his or her boss's phone number as the alternate phone number and could configure device 100 via the user interface mentioned.

In the preceding specific example, the enterprise-provided alternate phone number is based on the assumption that user 100*u* would likely still be on campus if they made a department-level phone call, possibly in a campus parking lot between two secured buildings. Such as an approach can be generalized, bumping each "outside of service area" phone call to another level. In other words, in some embodiments, an alternate emergency-response service is first determined in one of several ways, then, at step 552*d*, the final phone number is determined based on the alternate emergency-response service and on enterprise and/or supplemental location data associated with device 100.

In one such embodiment, optional steps 515 and 520 of FIG. 5 are repeated, but in a new form. At step 515*a*, an emergency-calling interface is rendered on display 140 of device 100, providing the user with the option to select from amongst emergency-response services other than the service originally selected (and determined to be inappropriate). For example, if user 100*u* originally chose "Department First-Aid Call" option 904 from emergency-calling GUI 900 of FIG. 9, the subsequent GUI would omit that previously chosen option, as in emergency-calling GUI 900*a* of FIG. 9A. Likewise, if user 100*u* originally chose "Corporate Security Call" option 903 from emergency-calling GUI 900 of FIG. 9, the subsequent GUI would omit that previously chosen option, as in emergency-calling GUI 900*c* of FIG. 9C. In both of these examples, the subsequent emergency-calling GUI provides all options except the originally selected option. But in some embodiments, the levels of emergency response are ranked (e.g., by granularity), and the subsequent emergency-calling GUI displayed according to step 515*a* provides only options corresponding to emergency-response services of higher rank than that of the originally selected emergency-response service. Thus, if user 100*u* originally chose "Corporate Security Call" option 903 from emergency-calling GUI 900 of FIG. 9, the subsequent GUI would omit that previously chosen option as well as the more lowly ranked "Department First-Aid Call" option 904, as in emergency-calling GUI 900*b* of FIG. 9B. Regardless of the precise form of the subsequent emergency-calling GUI provided at step 515*a*, at step 520*a* a second selection of an emergency-response service is received.

In other embodiments, the selection of an alternate emergency-response service is made automatically by method 1200 of FIG. 12. In one such embodiment, an alternate emergency-response service associated with the selected emergency-response service is determined at step 551*a*. For example, a presumably doomed "Department First-Aid Call" could be proactively "re-routed" to become a "Corporate Security Call." If each service area for the selected emergency-response service is wholly contained within a service area for the alternate emergency-response service associated with the selected emergency-response service, the determination of the alternate emergency-response service will result in "re-routings" consistent with geography and with user expectations. This demonstrates the desirability of having service areas of one level cleanly "nested" within service areas of a coarser-granularity level.

In other embodiments, the levels of emergency response are ranked (e.g., by granularity), and the alternate emergency-response service selected at step 551*b* is one of higher rank than that of the originally selected emergency-response service. In one such embodiment, the alternate emergency-response service is the one of next higher rank (e.g., the one of next coarser granularity). In another such embodiment, the alternate emergency-response service is the one of highest rank (e.g., "Civil Emergency Call"). The skilled person will appreciate that alternative steps 551a and 551b can be implemented by means of alternate-service look-up tables (much as the alternate-number look-up table is used to determine the final phone number in step 552c of an embodiment described earlier) that are either permanent or changeable (possibly with updates pulled by or pushed to device 100). Alternatively, emergency-calling functionality 123 can be configured to execute an algorithm to determine the alternate emergency-response service at step 551a or step 551b.

In yet other embodiments, the final phone number is determined based on supplemental location data (of any type previously described) that had been obtained at step 531d. It should be noted that step 531d has been described above as a precursor to step 535, at which an outside-coverage condition is detected. That may, in fact be the case, especially in an egress-agnostic system, wherein it is advisable to always check the plausibility of enterprise location data. But FIG. 12 also depicts dashed arrows from step 531d indicating that said step can contribute to the steps described next, without contributing to step 535. This comes about when a location anomaly is detected at step without input from (or even performance of) step 531d (i.e., due to at least one of the occurrences in steps 532a to 532c). In response to the detection at step 535, supplemental location data can be obtained for the purposes of augmenting the enterprise location data to perform the steps described next (or to be used in further variations of post-535 steps already described).

In one augmented-data embodiment, an alternate emergency-response service is first selected at step 551c based on the supplemental location data, then, at step 552d, the final phone number is determined based on the alternate emergency-response service and on enterprise and/or supplemental location data associated with device 100. For example, suppose the originally selected emergency-response service was "Department First-Aid Call" and enterprise electronic location data indicates (incorrectly) that device 100 is in the Legal Department portion of the fifth floor of Building 30 at the enterprise's Waterloo campus. If supplemental location data indicates device 100 is in Mississauga, where the enterprise has another campus, then "Corporate Security Call" would be selected as the alternate emergency-response service. Although there is no direct evidence that device 100 is within that campus, the corporate-security responder for that campus is more likely to be of help (for example, if user 100u has been injured in a parking lot of that campus) than the like responder at the Waterloo campus. But, if, on the other hand, supplemental location data indicates device 100 is in Banff, where the enterprise has no campus, then "Civil Emergency Call" would be selected as the alternate emergency-response service. The determination of the alternate emergency-response service can be based on a known mapping from possible values for enterprise location data to possible geographic indicators, as well as a partial mapping from possible.

In another augmented-data embodiment, at step 552e, the final phone number is determined based on the enterprise and supplemental location data associated with device 100.

Thus far, currency of enterprise location data and supplemental location data has been important. In fact, the consultation of current supplemental data has been presented as a check on the validity of the most recent enterprise location data. However, it is further anticipated that historical enterprise and/or supplemental location data can be of use in making determinations at some of the steps of method 1200. Historical location data can include basic location data prior stored prior to the storing of the most recent location data or compilations, statistics, or analysis of such basic data. For example, to return to the example of supplemental data indicating device 100 is in Mississauga although the most recent enterprise data is from a Waterloo departmental service area, if a "Department First-Aid Call" is requested, it can be routed to the Mississauga department user 100u most recently or most frequently visited when he or she was at the Mississauga campus. Such a determination can be based on a known correlation between historical enterprise location data and either historical supplemental data or a known correspondence between enterprise locations and geographic locations (such as would constitute supplemental location data). In the case of a "most frequently visited" criterion, further compilation and analysis of the data would be needed.

Numerous variations of the methods described above for placing emergency phone calls will be apparent to a person of ordinary skill in the art as falling within the intent of this disclosure as claimed hereinbelow. Moreover, the skilled person will be able to implement any claimed method by means of a corresponding system designed appropriately for that method, using components exemplified by those described hereinabove in relation to FIG. 4.

That which is claimed is:

1. A method of placing an emergency phone call from a mobile communication device, enabled for voice communication and for data communication, to an enterprise other than a civil authority, the method comprising:
   receiving, at the mobile communication device, a selection of an enterprise emergency-response service hosted by the enterprise;
   determining enterprise location data based on a location of the mobile communication device within a premises of the enterprise;
   determining an enterprise emergency phone number from a plurality of enterprise emergency phone numbers based on said selected enterprise emergency-response service and on said enterprise location data, wherein each of the plurality of enterprise emergency phone numbers is associated with a particular enterprise-response service and particular location within the premises; and
   placing the emergency phone call from the mobile communication device to said determined enterprise emergency phone number without placing a call to a civil authority.

2. The method of claim 1, wherein determining said enterprise location data is based on interaction between a token, uniquely associated with the mobile communication device, and an enterprise electronic location system.

3. The method of claim 2, wherein said token comprises at least one of: a proximity identification device at the mobile communication device; an identification card uniquely associated with a designated user of the mobile communication device; a pass code uniquely associated with the designated user of the mobile communication device; and a biometric feature uniquely associated with the designated user of the mobile communication device.

4. The method of claim 2, wherein said electronic location system comprises at least one of: an electronic access-control system; an electronic asset-tracking system; and a wireless network-access system.

5. The method of claim 2, wherein said electronic location system comprises a plurality of fixed detectors operable for detecting the presence or proximity of said token, and wherein said enterprise location data is based on the location of the detector, of said plurality of detectors, which most recently detected the presence or proximity of said token.

6. The method of claim 2, wherein said determining comprises detecting an indication that the mobile communication device is outside coverage for said selected emergency-response service.

7. The method of claim 6, wherein said indication is at least one of: a granting of egress permission, to said token, by a electronic access-control system; a loss of contact, with said token, by an electronic asset-tracking system; a disconnection of the mobile communication device from a wireless network-access system; and a conflict between said enterprise location data and supplemental location data associated with the mobile communication device.

8. The method of claim 6, further comprising:
providing, subsequent to receiving said selection, a prompt for confirmation to place the emergency phone call for said selected emergency-response service; and
receiving a confirmation to place the emergency phone call for said selected emergency-response service;
and wherein said placing the emergency phone call is in response to said receiving said confirmation.

9. The method of claim 6, further comprising:
providing, subsequent to receiving said selection, an interface for selecting from amongst at least one emergency-response service other than said selected emergency-response service; and
receiving a selection of an alternate emergency-response service; and wherein said determining is further based on said alternate emergency-response service.

10. The method of claim 6, wherein said determining comprises:
determining a preliminary phone number based on said selected emergency-response service and on said enterprise location data; and
determining as said emergency phone number a pre-determined alternate phone number associated with said preliminary phone number.

11. The method of claim 6, wherein said determining comprises:
determining an alternate emergency-response service; and
determining said emergency phone number based on said alternate emergency-response service.

12. The method of claim 11, wherein said determining said alternate emergency-response service is based on at least one of: a pre-determined emergency-response service associated with said selected emergency-response service; an emergency-response service having a higher rank than said selected emergency-response service; and supplemental location data associated with the mobile communication device.

13. The method of claim 1, wherein said determining said enterprise emergency phone number comprises determining said enterprise emergency phone number at the mobile communication device.

14. The method of claim 13, wherein said determining comprises using a service-specific look-up table stored at the mobile communication device and corresponding to said selected emergency-response service to look up said determined emergency phone number based on said enterprise location data.

15. The method of claim 14, further comprising receiving said service-specific look-up table, at the mobile communication device, from an external device in one of: a reply to a request from the mobile communication device; an update of said service-specific look-up table initiated by said external device; and a provisioning of the mobile communication device.

16. The method of claim 14, further comprising receiving said enterprise location data at the mobile communication device from an external device in one of: a reply to a request from the mobile communication device; and an update of said enterprise location data initiated by said external device.

17. The method of claim 13, wherein said determining said enterprise emergency phone number comprises using a location-specific look-up table, stored at the mobile communication device, to look up said determined enterprise emergency phone number based on said selected enterprise emergency-response service and location within the premises.

18. The method of claim 17, further comprising receiving said location-specific look-up table, at the mobile communication device, from an external device in one of: a reply to a request from the mobile communication device; and an update of said location-specific look-up table initiated by said external device.

19. The method of claim 1, wherein said determining comprises:
requesting the emergency phone number from an external device; and
receiving the emergency phone number from said external device.

20. The method of claim 1, wherein said determining comprises:
placing a preliminary phone call, based on said selected emergency-response service, to said external device; and
determining, at said external device, said determined emergency phone number based on said preliminary phone call and on said enterprise location data; and wherein said placing the emergency phone call comprises forwarding said preliminary phone call from said external device to said determined emergency phone number.

21. The method of claim 1, further comprising providing, at the mobile communication device, an interface for selecting from amongst a plurality of emergency-response services including at least one enterprise emergency-response service, and wherein said selected enterprise emergency-response service is one of said at least one enterprise emergency-response service.

22. The method of claim 21, further comprising providing, in response to a termination of said placed emergency phone call, a subsequent interface for selecting an emergency-response service from amongst a subset of said plurality of emergency-response services, wherein said subset comprises one of: all emergency-response services of said plurality of emergency-response services; all emergency-response services of said plurality of emergency-response services except said selected enterprise emergency-response service; and all emergency-response services of said plurality of emergency-response services having a higher ranking than said selected enterprise emergency-response service.

23. The method of claim 1, wherein said determining said enterprise emergency phone number is further based on supplemental location data associated with the mobile communication device, and wherein at least one of said enterprise location data and supplemental location data is historical location data.

24. A system for placing an emergency phone call to an enterprise other than a civil authority, the system comprising:
 a mobile communication device enabled for voice communication and for data communication; and
 an electronic location system enabled for creating enterprise location data based on a location of the mobile communication device within a premises of the enterprise;
 wherein said mobile communication device is further enabled for:
  receiving a selection of an enterprise emergency-response service hosted by the enterprise;
  determining an enterprise emergency phone number from a plurality of enterprise emergency phone numbers based on said selected enterprise emergency-response service and on said enterprise location data, wherein each of the plurality of enterprise emergency phone numbers is associated with a particular enterprise-response service and particular location within the premises; and
  placing an emergency phone call to said enterprise emergency phone number determined based on said selected enterprise emergency-response service and on said enterprise location data without placing a call to a civil authority.

25. The system of claim 24, further comprising a token uniquely associated with said mobile communication device; and wherein said enterprise location data is based on interaction between said token and said enterprise electronic location system.

* * * * *